(12) United States Patent
Kawauchi et al.

(10) Patent No.: US 8,073,066 B2
(45) Date of Patent: Dec. 6, 2011

(54) SIGNAL RECEIVING APPARATUS, SIGNAL RECEIVING METHOD AND PROGRAM

(75) Inventors: Hidetoshi Kawauchi, Kanagawa (JP); Hideaki Nemoto, Kanagawa (JP); Kenichi Kobayashi, Chiba (JP)

(73) Assignee: Sony Corporation, Tokyo (JP)

( * ) Notice: Subject to any disclaimer, the term of this patent is extended or adjusted under 35 U.S.C. 154(b) by 539 days.

(21) Appl. No.: 12/259,378

(22) Filed: Oct. 28, 2008

(65) Prior Publication Data
US 2009/0110099 A1 Apr. 30, 2009

(30) Foreign Application Priority Data
Oct. 30, 2007 (JP) ................................ P2007-282201

(51) Int. Cl.
*H04L 27/28* (2006.01)
(52) U.S. Cl. ..................................................... 375/260

(58) Field of Classification Search .................. 375/260, 375/275, 316, 324, 340, 344, 350, 240.18; 342/196; 708/404, 405; 379/406.13; 370/210
See application file for complete search history.

(56) References Cited

U.S. PATENT DOCUMENTS

| | | | |
|---|---|---|---|
| 6,993,083 B1 * | 1/2006 | Shirakata et al. | 375/260 |
| 7,177,376 B2 * | 2/2007 | Atungsiri et al. | 375/343 |
| 7,577,087 B2 * | 8/2009 | Palin | 370/210 |
| 7,706,479 B2 * | 4/2010 | Adachi | 375/340 |
| 7,769,094 B2 * | 8/2010 | Wilhelmsson | 375/260 |
| 7,817,738 B2 * | 10/2010 | Takeuchi et al. | 375/260 |

FOREIGN PATENT DOCUMENTS

| | | |
|---|---|---|
| JP | 2005 303440 | 10/2005 |
| WO | WO 2006 111843 | 10/2006 |

* cited by examiner

*Primary Examiner* — Sam K Ahn
(74) *Attorney, Agent, or Firm* — Frommer Lawrence & Haug LLP; William S. Frommer

(57) ABSTRACT

Disclosed herein is a signal receiving apparatus including a profile inference section; a delay-spread computation section; a position determination section; a signal-by-function multiplication section; an interval extraction section; an interval-to-signal addition section; and a signal processing section.

6 Claims, 19 Drawing Sheets

FIG. 8A TIME-DOMAIN OFDM SIGNAL

FIG. 8B TRAPEZOIDAL WINDOW FUNCTION

FIG. 8C PROTRUDING WINDOW FUNCTION

FIG. 8D RAISED COSINE WINDOW FUNCTION

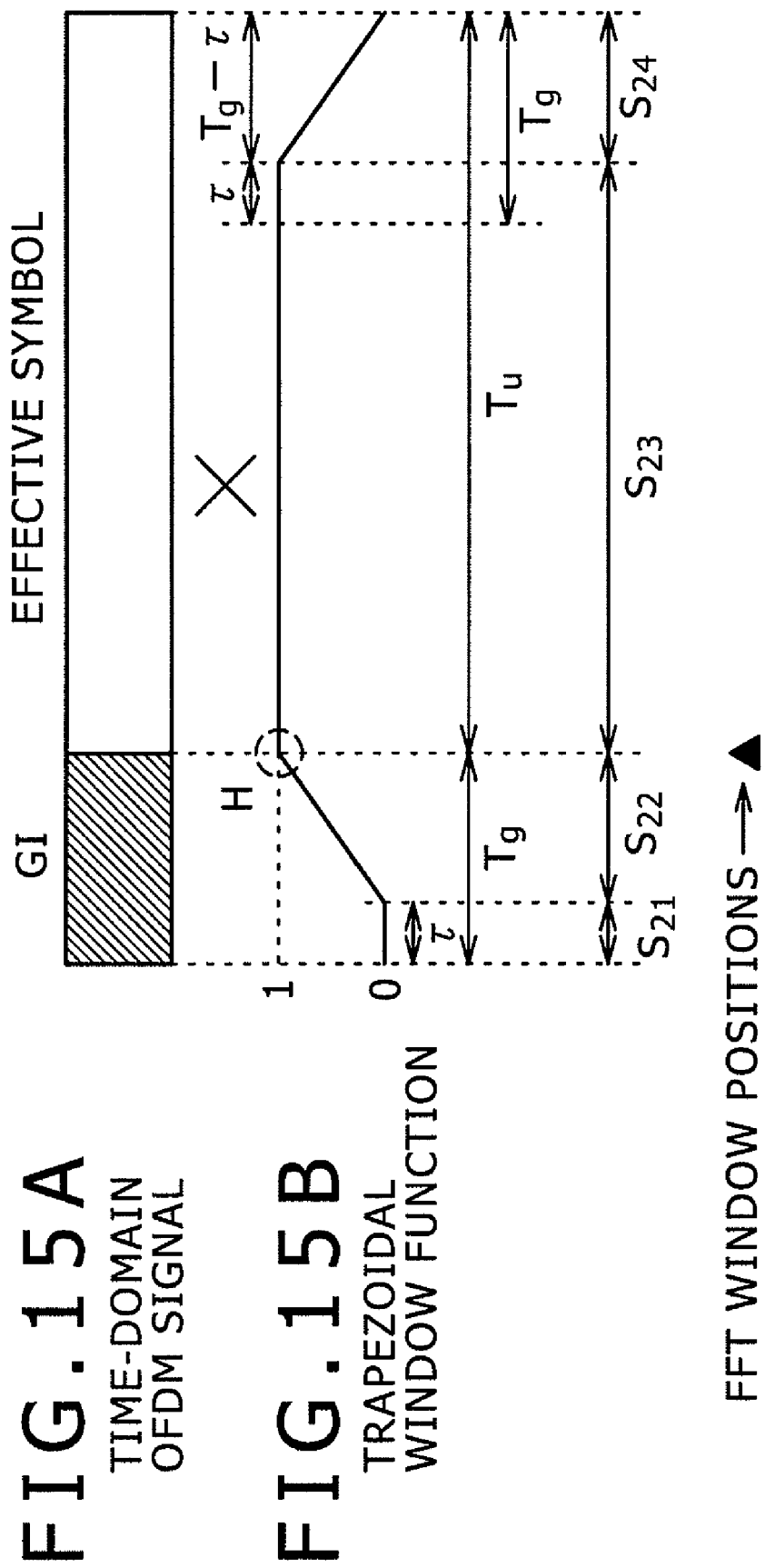
FIG.15A TIME-DOMAIN OFDM SIGNAL
FIG.15B TRAPEZOIDAL WINDOW FUNCTION

OUTPUT FROM
WINDOW-FUNCTION
UTILIZATION
CIRCUIT

OUTPUT FROM
GI EXTRACTION
CIRCUIT

OUTPUT FROM
GI DELAYING
CIRCUIT

OUTPUT FROM
GI-TO-SIGNAL
ADDITION CIRCUIT

OUTPUT FROM
N-SAMPLE
EXTRACTION CIRCUIT
(INPUT TO N-POINT FFT
PROCESSING CIRCUIT)

FFT WINDOW POSITIONS → ▲

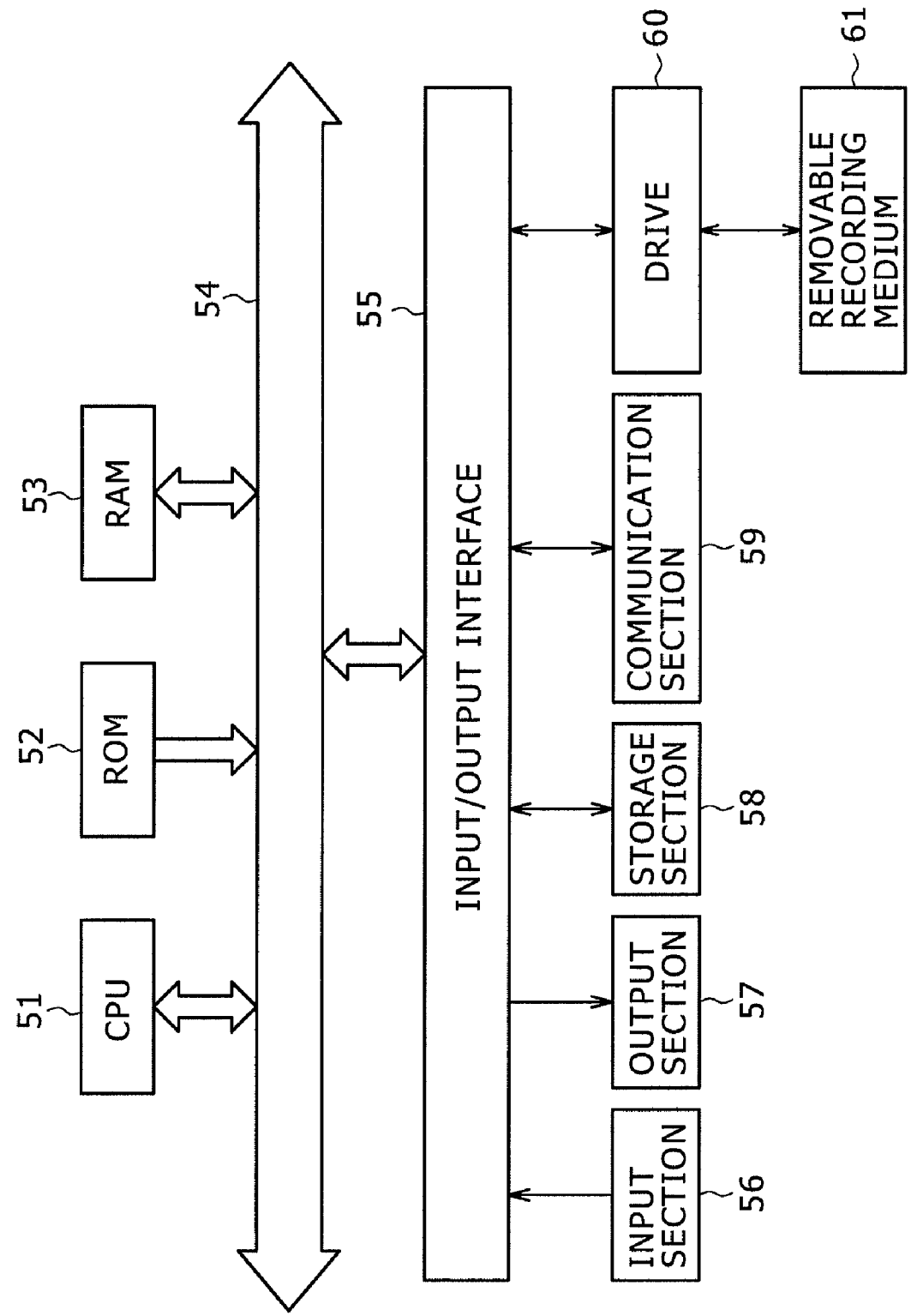

SIGNAL RECEIVING APPARATUS, SIGNAL RECEIVING METHOD AND PROGRAM

CROSS REFERENCES TO RELATED APPLICATIONS

The present invention contains subject matter related to Japanese Patent Application JP 2007-282201 filed in the Japan Patent Office on Oct. 30, 2007, the entire contents of which being incorporated herein by reference.

BACKGROUND OF THE INVENTION

1. Field of the Invention

In general, the present invention relates to a signal receiving apparatus, a signal receiving method adopted by the signal receiving apparatus and a program implementing the signal receiving method. In particular, the embodiments of the present invention relates to a signal receiving apparatus capable of easily carrying out an OFDM (Orthogonal Frequency Division Multiplexing) demodulation process making use of a window function without causing an ISI (Inter Symbol Interference) even in a multipath environment, relates to a signal receiving method adopted by the signal receiving apparatus and relates to a program implementing the signal receiving method.

2. Description of the Related Art

As a method for modulating a ground digital broadcast, there has been proposed an OFDM (Orthogonal Frequency Division Multiplexing) method for modulating a number of various orthogonal carrier waves by adoption a PSK (Phase Shift Keying) technique and/or a QAM (Quadrature Amplitude Modulation) technique (Japanese Patent Laid-Open No. 2005-303440).

The OFDM method is defined in that, since the entire transmission band is divided into a number of transmission sub-bands each allocated to a sub-carrier wave, the width of the transmission sub-band is small, giving rise to a low transmission speed even though the total transmission speed does not change from the speed according to the existing modulation method.

In addition, the OFDM method is also defined in that, since a number of sub-carrier waves are transmitted, the symbol speed is low. Thus, the multipath time length relative to the time length of one symbol can be reduced. As a result, the OFDM method also has a characteristic that a transmission according to the OFDM method is hardly affected by the multipath.

On top of that, the OFDM method is also defined in that, since data is assigned to a plurality of sub-carrier waves, a signal transmitting circuit can be constructed by making use of an IFFT (Inverse Fast Fourier Transform) processing circuit for carrying out an inverse Fourier transform operation at a modulation time whereas a signal receiving circuit can be constructed by making use of an FFT (Fast Fourier Transform) processing circuit for carrying out a Fourier transform operation at a demodulation time.

FIG. 1 is a diagram showing a sequence of OFDM symbols.

In accordance with the OFDM method, a signal is transmitted in units each referred to as an OFDM symbol.

As shown in the diagram of FIG. 1, one OFDM symbol includes an effective symbol and a guard interval referred to hereafter simply as a GI. The effective symbol is a signal segment on which an IFFT operation is carried out at a transmission time. On the other hand, the GI is a copy of the waveform of a later portion of the effective symbol. The GI is inserted into a position existing on the time axis as a position in the front of the effective symbol.

By inserting such a GI in accordance with the OFDM method, the OFDM method is capable of preventing an ISI (Inter Symbol Interference, which is an interference between symbols) from occurring in a multipath environment.

A plurality of such OFDM symbols are collected to form an OFDM-transmitted frame. For example, in accordance with ISDB-T (Integrated Services Digital Broadcasting-Terrestrial) specifications, 204 OFDM symbols form an OFDM-transmitted frame. The ISDB-T specifications are specifications prescribing ground digital broadcasts transmitted in Japan.

In accordance with the OFDM method, by using an OSDM-transmitted frame unit as a reference, each of a data carrier wave, an SP (Spread Pilot) signal and a TMCC carrier wave is used as a sub-carrier wave as shown in a diagram of FIG. 2. The data carrier wave is a carrier wave for transmitting data. The SP signal is a signal used for inferring a transmission characteristic (or a frequency characteristic) on the OFDM receiver side. The TMCC carrier wave is a carrier wave for transmitting transmission parameters.

Placed at fixed intervals, the SP signals are each a complex vector having a known amplitude and a known phase. The data sub-carrier wave conveying data to be transmitted is placed between SP signals. An OFDM receiver receives an SP signal in a state distorted due to an effect of the characteristic of the transmission line. Since the state of the SP signal at a signal transmitting time is known, however, the characteristic of the transmission line can be inferred by comparing the state of the SP signal at a signal transmitting time with the state of the SP signal at a signal receiving time.

FIG. 3 is a block diagram showing a typical configuration of the existing OFDM receiver.

As shown in the block diagram of FIG. 3, the existing OFDM receiver employs an antenna 1, a frequency conversion circuit 2, a local oscillation circuit 3, an A/D (Analog/Digital) conversion circuit 4, a orthogonal-demodulation circuit 5, a local oscillation circuit 6, an FFT circuit 7, an SP-signal extraction circuit 8, a time-direction transmission-line characteristic inference circuit 9, a frequency-direction transmission-line characteristic inference circuit 10, a transmission-line compensation circuit 11, a carrier-frequency synchronization circuit 12, a window reproduction circuit 13 and a delay-profile inference circuit 14.

The frequency conversion circuit 2 is a section for multiplying an RF signal received from the antenna 1 by a carrier wave received from the local oscillation circuit 3 as a carrier wave with an oscillation frequency of $(f_c+f_{IF})$ in order to convert the RF signal into an IF signal having a center frequency $f_{IF}$ and for outputting the IF signal obtained as a result of the frequency conversion process to the A/D conversion circuit 4.

The A/D conversion circuit 4 is a section for carrying out an A/D conversion process of converting the analog IF signal received from the frequency conversion circuit 2 into a digital IF signal and outputting the digital IF signal obtained as a result of the A/D conversion process to the orthogonal-demodulation circuit 5.

The orthogonal-demodulation circuit 5 is a section for carrying out an orthogonal demodulation process making use of a carrier wave received from the local oscillation circuit 6 as a carrier wave having the frequency $f_{IF}$ in order to acquire a baseband OFDM signal from the digital IF signal supplied by the A/D conversion circuit 4. The baseband OFDM signal is the so-called time-domain OFDM signal not subjected yet to an FFT process. The orthogonal-demodulation circuit 5 outputs the time-domain OFDM signal obtained as a result of the orthogonal demodulation process to the carrier-frequency synchronization circuit 12, the FFT circuit 7 and the window reproduction circuit 13.

The FFT circuit 7 is a section for removing a GI from the time-domain OFDM signal on the basis of an FFT window position specified by the window reproduction circuit 13 in order to extract a signal in a range including an effective symbol associated included in the same OFDM symbol as the removed GI from the time-domain OFDM signal.

The FFT circuit 7 is also a section for carrying out an FFT process on the extracted signal as a demodulation process in order to generate a post-demodulation OFDM signal and outputting the generated post-demodulation OFDM signal to the SP-signal extraction circuit 8 and the transmission-line compensation circuit 11. The post-demodulation OFDM signal generated by the FFT circuit 7 is the so-called frequency-domain OFDM signal which is obtained as a result of the FFT process.

The start position of the FFT process carried out by the FFT circuit 7 is a position between positions A and B shown in the diagram of FIG. 1. The position A is a position on a boundary between two adjacent OFDM symbols whereas the position B is a position on a boundary between an effective symbol included in the later one of the two adjacent OFDM symbols and a GI included in the same later OFDM symbol as the effective symbol. The range of the FFT process is referred to as an FFT window. Referred to hereafter as an FFT window position cited above, the start position of the FFT window is specified by the window reproduction circuit 13.

The SP-signal extraction circuit 8 is a section for extracting an SP signal from the frequency-domain OFDM signal received from the FFT circuit 7 and removing modulation components from the extracted SP signal in order to infer a transmission-line characteristic prevailing at the position of an OFDM symbol associated with the SP signal as a transmission-line characteristic of a sub-carrier wave. The SP-signal extraction circuit 8 outputs a signal representing the transmission-line characteristic of the sub-carrier wave to the time-direction transmission-line characteristic inference circuit 9.

The time-direction transmission-line characteristic inference circuit 9 is a section for inferring transmission-line characteristics prevailing at positions of other OFDM symbols lined up in the time-axis direction (which is also referred to as an OFDM-symbol direction) in an area between the positions of specific OFDM symbols each associated with an SP signal as transmission-line characteristics of a sub-carrier wave on the basis of the transmission-line characteristics inferred by the SP-signal extraction circuit 8 as the transmission-line characteristics which prevail at the positions of the specific OFDM symbols as the transmission-line characteristics of the sub-carrier wave. In the diagram of FIG. 2, the vertical direction is the time-axis direction whereas the horizontal direction is a frequency direction.

Let us assume for example that the SP-signal extraction circuit 8 infers transmission-line characteristics prevailing at the positions of specific OFDM symbols associated with SP signals $SP_1$ and $SP_2$ shown in the diagram of FIG. 2 as transmission-line characteristics of a sub-carrier wave having a sub-carrier number of 0. In this case, the time-direction transmission-line characteristic inference circuit 9 infers transmission-line characteristics prevailing at the positions of other OFDM symbols in an area A1 sandwiched between the positions of the specific OFDM symbols as shown in the diagram of FIG. 2 as transmission-line characteristics of the sub-carrier wave by making use of transmission-line characteristics inferred by the SP-signal extraction circuit 8.

As shown in the diagram of FIG. 2, since a plurality of SP signals are inserted for every 3 sub-carrier waves, the time-direction transmission-line characteristic inference circuit 9 infers transmission-line characteristics prevailing at positions of other OFDM symbols lined up in the time-axis direction (which is also referred to as an OFDM-symbol direction) in an area between the positions of specific OFDM symbols each associated with one of the inserted SP signals as transmission-line characteristics of a sub-carrier wave. For every 3 sub-carrier waves, the time-direction transmission-line characteristic inference circuit 9 outputs a signal representing transmission-line characteristics inferred thereby as the transmission-line characteristics of the three sub-carrier waves to the frequency-direction transmission-line characteristic inference circuit 10 and the delay-profile inference circuit 14. The transmission-line characteristics represented by the signal output by the time-direction transmission-line characteristic inference circuit 9 include the transmission-line characteristics inferred by the SP-signal extraction circuit 8.

The frequency-direction transmission-line characteristic inference circuit 10 is a section for inferring transmission-line characteristics prevailing at positions of OFDM symbols lined up in the frequency direction (which is also referred to as a sub-carrier direction) as transmission-line characteristics of sub-carrier waves on the basis of transmission-line characteristics output by the time-direction transmission-line characteristic inference circuit 9.

For example, the frequency-direction transmission-line characteristic inference circuit 10 infers transmission-line characteristics prevailing at positions of an OFDM symbol included in an area $A_2$ shown in the diagram of FIG. 2 as OFDM symbol #3 conveyed at the same time by sub-carrier waves having different sub-carrier numbers as shown in the diagram of FIG. 2 as transmission-line characteristics of the sub-carrier waves. However, the frequency-direction transmission-line characteristic inference circuit 10 infers merely transmission-line characteristics which have not been inferred yet by the SP-signal extraction circuit 8 and the time-direction transmission-line characteristic inference circuit 9. Thus, the frequency-direction transmission-line characteristic inference circuit 10 infers transmission-line characteristics by making use of transmission-line characteristics inferred by the SP-signal extraction circuit 8 and the time-direction transmission-line characteristic inference circuit 9.

As a result, the transmission-line characteristics prevailing at the positions of all OFDM symbols as transmission-line characteristics of sub-carrier waves are inferred. The frequency-direction transmission-line characteristic inference circuit 10 outputs a signal representing the inferred transmission-line characteristics to the transmission-line compensation circuit 11.

The transmission-line compensation circuit 11 is a section for removing distortion components, which are included in the frequency-domain OFDM signal received from the FFT circuit 7 as components attributed to distortions occurring along the transmission line, by making use of transmission-line characteristics represented by a signal output by the frequency-direction transmission-line characteristic inference circuit 10. The transmission-line compensation circuit 11 outputs a frequency-domain OFDM signal including no distortion components to circuits at a stage succeeding this OFDM receiver as an equalizer output signal.

The carrier-frequency synchronization circuit 12 is a section for controlling the local oscillation circuit 6 on the basis of the time-domain OFDM signal received from the orthogonal-demodulation circuit 5 in order to drive the local oscillation circuit 6 to output a carrier wave having an oscillation frequency $f_{IF}$ synchronized with the frequency of the IF signal generated by the frequency conversion circuit 2 to the orthogonal-demodulation circuit 5.

The window reproduction circuit 13 is a section for determining an FFT window position on the basis of the time-domain OFDM signal received from the orthogonal-demodulation circuit 5 and a delay-profile signal received from the delay-profile inference circuit 14 and outputting the determined FFT window position to the FFT circuit 7.

The delay-profile inference circuit 14 is a section for inferring a delay profile of the transmission line by finding a time response characteristic of the transmission line and outputting a signal representing the inferred delay profile to the window reproduction circuit 13.

Typically, the delay-profile inference circuit 14 carries out an IFFT process on transmission-line characteristics represented by a signal output by the time-direction transmission-line characteristic inference circuit 9 in order to infer the delay profile of the transmission line. Since the transmission-line characteristic represented by a signal output by the time-direction transmission-line characteristic inference circuit 9 is a frequency characteristic, a time response characteristic obtained as a result of the IFFT process carried out on the transmission-line characteristic is a delay profile.

FIG. 4 is a block diagram showing a typical configuration of the FFT circuit 7 employed in the existing OFDM receiver shown in the block diagram of FIG. 3.

As shown in the block diagram of FIG. 4, the FFT circuit 7 employs a GI removal circuit 7-1 and an FFT processing circuit 7-2.

The GI removal circuit 7-1 is a section for removing a GI included in a time-domain OFDM signal received from the orthogonal-demodulation circuit 5 on the basis of an FFT window position received from the window reproduction circuit 13. The GI removal circuit 7-1 outputs an effective symbol obtained as a result of the process to remove a GI included in a time-domain OFDM signal to the FFT processing circuit 7-2.

The FFT processing circuit 7-2 is a section for carrying an FFT process on an effective symbol received from the GI removal circuit 7-1 in order to transform a time-domain OFDM signal including the effective symbol into a frequency-domain OFDM signal. The FFT processing circuit 7-2 outputs the frequency-domain OFDM signal obtained as a result of the FFT process to the SP-signal extraction circuit 8 and the transmission-line compensation circuit 11.

The FFT window position which is the start of the FFT process mentioned above is explained by referring to diagrams of FIGS. 5 and 6 as follows.

FIG. 5 is a diagram showing a typical FFT window position in a 1-wave environment whereas FIG. 6 is a diagram showing a typical FFT window position in a multipath environment.

In the 1-wave environment, an OFDM signal consisting of merely a principal wave as shown in the diagram of FIG. 5 is received by the OFDM receiver. In this diagram, notation Tu denotes the length of an effective wave represented by the OFDM signal whereas notation Tg denotes the length of a GI included in the same OFDM signal as the effective wave.

The FFT window position is a position between positions C and D shown in the diagram of FIG. 5. The position C is a position on a boundary between two adjacent OFDM symbols whereas the position D is a position on a boundary between an effective symbol of the later one of the two adjacent OFDM symbols and a GI included in the same later OFDM symbol as the effective symbol. In the case of the typical 1-wave environment shown in the diagram of FIG. 5, the FFT window position is specified to be the position D. As described above, the GI removal circuit 7-1 removes a GI included in a time-domain OFDM signal received from the orthogonal-demodulation circuit 5 on the basis of an FFT window position received from the window reproduction circuit 13. A range starting from the FFT window position as a range consisting of N FFT points is used as an FFT window. Notation N also denotes the number of samples in the effective symbol.

In the multipath environment, on the other hand, an OFDM signal consisting of the principal wave and a delayed wave as shown in the diagram of FIG. 6 is received by the OFDM receiver. For the sake of the convenience of the explanation, a multipath environment of two waves, i.e., the principal wave and a delayed wave, is explained.

In the case of the typical multipath environment shown in the diagram of FIG. 6, the OFDM receiver receives a compound wave consisting of the principal wave, which serves as a direct wave, and a delayed wave. The delayed wave is a wave which is delayed from the principal wave by a delay time τ and has an attenuated amplitude. As shown in the diagram of FIG. 6, the width of a band representing the principal wave is made greater than the width of a band representing the delayed wave in order to indicate that the amplitude of the principal wave is greater than the amplitude of the delayed wave.

In the case of the typical multipath environment shown in the diagram of FIG. 6, in order to prevent an ISI (Inter-Symbol Interference) from occurring after a demodulation process, the FFT window position is set at a position between positions E and F shown in the diagram of FIG. 6. The position E is the start position of an OFDM symbol represented in the delayed wave. There is no interference in this OFDM symbol from an OFDM symbol immediately preceding this OFDM symbol. On the other hand, the position F is a position on a boundary between an effective symbol represented by the principal wave and a GI included in the same OFDM symbol as the effective symbol in the principal wave. Thus, in the case of a typical multipath environment, the range in which the FFT window position can be specified is narrow in comparison with the range in a 1-wave environment.

In the case of the typical multipath environment shown in the diagram of FIG. 6, the FFT window position is specified to be the position F which is a position on a boundary between an effective symbol represented by the principal wave and a GI included in the same OFDM symbol as the effective symbol in the principal wave.

An OFDM demodulation process making use of an FFT window is carried out as follows.

Muschallik C., 'Improving an OFDM reception using an adaptive Nyquist windowing', Consumer Electronics, IEEE Transactions, Volume 42, Issue 3, August 1996, Pages 259-269 discloses an OFDM demodulation process making use of a window function.

FIG. 7 is a block diagram showing a typical configuration of an FFT circuit 7 for carrying out an OFDM demodulation process making use of a window function.

As shown in the block diagram of FIG. 7, the FFT circuit 7 employs a window-function utilization circuit 7-11, a 0 addition circuit 7-12, a 2N-point FFT processing circuit 7-13 and an even-numbered carrier extraction circuit 7-14. In the same way of the FFT circuit 7 shown in the block diagram of FIG. 4, the FFT circuit 7 having a configuration like the one shown in the block diagram of FIG. 7 receives a time-domain OFDM signal from the orthogonal-demodulation circuit 5.

The window-function utilization circuit 7-11 is a section for setting a window function for a time-domain OFDM signal received from the orthogonal-demodulation circuit 5 on the basis of an FFT window position specified by the window reproduction circuit 13 and multiplying the time-domain OFDM signal by the window function in order to produce a weighted time-domain OFDM signal. The window-function utilization circuit 7-11 outputs the weighted time-domain OFDM signal obtained as a result of the operation to multiply the time-domain OFDM signal received from the orthogonal-demodulation circuit 5 by the window function to the 0 addition circuit 7-12. In the following description, the weighted time-domain OFDM signal is also referred to as a post-multiplication time-domain OFDM signal.

In order to allow an FFT process to be carried out on a time-domain OFDM signal having a format also including a GI, as shown in a diagram of FIG. 10C, the 0 addition circuit 7-12 adds 0 values, the number of which is determined in advance, to the tail of the weighted time-domain OFDM signal received from the window-function utilization circuit 7-11 and converts the weighted time-domain OFDM signal having 0s added thereto into a signal including 2N samples where notation N denotes the number of samples in an effective symbol. The 0 addition circuit 7-12 outputs the time-domain OFDM signal including the 2N samples to the 2N-point FFT processing circuit 7-13.

The 2N-point FFT processing circuit 7-13 is a section for carrying out a 2N-point FFT process on the 2N samples included in the time-domain OFDM signal having a GI in order to transform the time-domain OFDM signal including 2N samples into a frequency-domain OFDM signal. The 2N-point FFT processing circuit 7-13 outputs the frequency-domain OFDM signal obtained as a result of the FFT process to the even-numbered carrier extraction circuit 7-14.

The even-numbered carrier extraction circuit 7-14 is a section for extracting the signal of an even-numbered carrier wave from the frequency-domain OFDM signal supplied by the 2N-point FFT processing circuit 7-13 and outputting the extracted signal as a frequency-domain OFDM signal to the SP-signal extraction circuit 8 and the transmission-line compensation circuit 11.

FIG. 8 is a plurality of diagrams showing a time-domain OFDM signal and typical window functions.

To be more specific, FIG. 8A is a diagram showing a time-domain OFDM signal representing one OFDM symbol. FIG. 8B is a diagram showing a trapezoidal window function whereas FIG. 8C is a diagram showing a protruding window function. FIG. 8D is a diagram showing a raised cosine window function. In the diagrams of FIG. 8, the horizontal axis represents the lapse of time whereas the vertical axis represents the amplitude of time-domain OFDM signal and the values of the window functions. Each of the values of the window functions is used as a multiplier by which the amplitude of the time-domain OFDM signal is to be multiplied.

A time segment $S_1$ in the diagrams of FIG. 8 is a time segment corresponding to the time segment of the GI whereas a time segment $S_2$ is a time segment starting from the boundary between the GI and the effective symbol and ending at a position leading ahead of the end of the effective symbol by the length Tg of the GI. A time segment $S_3$ is a time segment between the position leading ahead of the end of the effective symbol by the length Tg of the GI and the end of the effective symbol.

As shown in the diagrams of FIG. 8, each of the window functions has a fixed window width of (Tu+Tg) and a predetermined value varying in the range 0 to 1 as a function of time.

With the start position of each window function coinciding with the start position of an OFDM symbol, the trapezoidal window function shown in the diagram of FIG. 8B has a value rising from 0 to 1 along a straight line over the time segment $S_1$ and the fixed value of 1 throughout the time segment $S_2$. The trapezoidal window function has a value decreasing from 1 to 0 along a straight line over the time segment $S_3$.

The protruding window function shown in the diagram of FIG. 8C has a fixed value of 0.5 throughout the time segment $S_1$ and a fixed value of 1 throughout the time segment $S_2$. The protruding window function has the fixed value of 0.5 throughout the time segment $S_3$.

The raised cosine window function shown in the diagram of FIG. 8D has a value rising from 0 to 1 along a curved line over the time segment $S_1$ and the fixed value of 1 throughout the time segment $S_2$. The raised cosine window function has a value decreasing from 1 to 0 along a curved line over the time segment $S_3$.

A window function is defined in that, if the time segment $S_3$ of the window function itself overlaps the time segment $S_1$ of the window function shifted by a distance corresponding to the length Tu of the effective symbol in the time lapsing direction along the time axis as shown in a diagram of FIG. 9, the sum of the values of the window function itself and the shifted window function in the overlapping time segments $S_1$ and $S_3$ each having the GI length Tg is equal to 1 throughout the overlapping time segments $S_1$ and $S_3$.

For example, a trapezoidal window function W' shown in the diagram of FIG. 9 is a window function obtained as a result of shifting a trapezoidal window function W by a distance corresponding to the length Tu of the effective symbol in the time lapsing direction along the time axis. Times t1 and t2 are any arbitrary points of time in the overlapping time segment $S_3$ of the trapezoidal window function W and the overlapping time segment $S_1$ of the trapezoidal window function W'. At each of the times t1 and t2, the sum of the values of the trapezoidal window functions W and W' is equal to 1.

FIG. 10 is a plurality of explanatory diagrams each referred to in description of an OFDM demodulation process carried out by making use of the trapezoidal window function shown in the diagram of FIG. 8.

To be more specific, FIG. 10A is a diagram showing a time-domain OFDM signal representing one OFDM symbol whereas FIG. 10B is a diagram showing the trapezoidal window function. FIG. 10C is a diagram showing a time-domain OFDM signal supplied to the 2N-point FFT processing circuit 7-13 employed in the FFT circuit shown in the block diagram of FIG. 7.

The window-function utilization circuit 7-11 sets the trapezoidal window function shown in the diagram of FIG. 10B. As shown in this diagram, a position G is the start position of the time segment $S_2$ of the trapezoidal window function. As described earlier, the trapezoidal window function has a fixed value of 1 throughout the time segment $S_2$. The window-function utilization circuit 7-11 sets a trapezoidal window function that has a start position G coinciding with an FFT window position, which is specified by the window reproduction circuit 13, on the time axis. Then, the window-function utilization circuit 7-11 multiplies the time-domain OFDM signal shown in the diagram of FIG. 10A by the trapezoidal window function shown in the diagram of FIG. 10B in order to produce a weighted time-domain OFDM signal shown in the diagram of FIG. 10C.

In an OFDM receiver carrying out an OFDM demodulation process by making use of a window function, the position on the boundary between the GI and the effective symbol is an optimum FFT window position. In the typical OFDM demodulation process explained by referring to the diagrams of FIG. 10, the window reproduction circuit 13 specifies the optimum position as an FFT window position.

As described above, in this typical OFDM demodulation process, the window-function utilization circuit 7-11 multiplies the time-domain OFDM signal shown in the diagram of FIG. 10A by the trapezoidal window function shown in the diagram of FIG. 10B in order to produce a weighted time-domain OFDM signal having the same trapezoidal shape as the trapezoidal window function as shown in the diagram of FIG. 10C and supplies the weighted time-domain OFDM signal to the 0 addition circuit 7-12.

The 0 addition circuit 7-12 adds 0 values, the number of which is determined in advance, to the tail of the weighted time-domain OFDM signal received from the window-function utilization circuit 7-11 and converts the weighted time-domain OFDM signal into a signal including 2N samples as shown in the diagram of FIG. 10C where notation N denotes the number of samples in the effective symbol. The 0 addition circuit 7-12 then outputs the time-domain OFDM signal including the 2N samples to the 2N-point FFT processing circuit 7-13. The 2N-point FFT processing circuit 7-13 carries out a 2N-point FFT process on the 2N samples included in the time-domain OFDM signal having a GI in order to transform the time-domain OFDM signal including the 2N samples into a frequency-domain OFDM signal.

By making use of a GI, which is a copy of a later portion of an effective symbol included in the same OFDM symbol as the GI, in a demodulation process as described above, it is possible to provide the OFDM receiver with a characteristic of resistance against noises.

SUMMARY OF THE INVENTION

In order to carry out an FFT process on a time-domain OFDM signal having a format including a GI as part of an OFDM demodulation process making use of a window function as described above, the number of points in this FFT process is made twice the number of points in an FFT process carried out by the FFT circuit 7 shown in the block diagram of FIG. 4, raising problems of an increased amount of FFT processing and an increased size of a memory desired for the FFT process.

In addition, in a multipath environment, if the window width is fixed, a portion of an immediately preceding OFDM symbol in the delayed wave is also multiplied by a window function and inadvertently included in a time segment of 2N samples on which the FFT process is to be carried out. Thus, there is also raised a problem of an ISI (Inter Symbol Interference) occurring after the demodulation process as described below.

FIG. 11 is an explanatory diagram referred to in description of a typical OFDM demodulation process carried out in a multipath environment as a process resulting in an ISI.

In the typical OFDM demodulation process explained below by referring to the explanatory diagram of FIG. 11, the OFDM receiver receives a compound wave consisting of the principal wave, which serves as a direct wave, and a delayed wave. The delayed wave is a wave which is delayed from the principal wave by a delay time τ and has an attenuated amplitude. In addition, the position on the border between the GI of an OFDM symbol represented by the principal wave and an effective symbol included in the same OFDM symbol as the GI is specified as the FFT window position.

A time segment S11 is the time segment of a time-domain OFDM signal to be multiplied by a window function having a fixed window width of (Tu+Tg). The time segment S11 includes a time segment S12 representing a portion of an immediately preceding OFDM symbol in the delayed wave. The time segment S12 has a length equal to the delay time by which the delayed wave is delayed from the principal wave. Thus, since two OFDM symbols in the delayed wave are multiplied by one window function, an ISI inadvertently occurs after the demodulation process.

Addressing the problems described above, inventors of the embodiments of the present invention have innovated a signal receiving apparatus capable of easily carrying out an OFDM demodulation process making use of a window function without causing occurrence of an ISI even in a multipath environment, innovated a signal receiving method to be adopted in the signal receiving apparatus and innovated a program implementing the signal receiving method.

In accordance with a mode of the present invention, there is provided a signal receiving apparatus employing:

a profile inference section configured to infer a delay profile from a frequency-domain OFDM signal;

a delay-spread computation section configured to compute a delay spread on the basis of a delay profile inferred by the profile inference section;

a position determination section configured to determine an FFT window position by making use of a time-domain OFDM signal or a delay profile inferred by the profile inference section;

a signal-by-function multiplication section configured to multiply a window function formed on the basis of a delay spread computed by the delay-spread computation section and an FFT window position determined by the position determination section by a time-domain OFDM signal representing one OFDM symbol in order to generate a post-multiplication time-domain OFDM signal;

an interval extraction section configured to extract a guide interval from a post-multiplication time-domain OFDM signal generated by the signal-by-function multiplication section;

an interval-to-signal addition section configured to add a guide interval extracted by the interval extraction section to a portion included in a post-multiplication time-domain OFDM signal generated by the signal-by-function multiplication section as a portion starting from a position leading ahead of the end position of an OFDM symbol represented by the post-multiplication time-domain OFDM signal along the time axis by a time distance equal to a difference obtained as a result of subtracting a time segment corresponding to a delay spread computed by the delay-spread computation section from the time segment of the guide interval; and a signal processing section configured to carry out an FFT process on a portion included in a post-multiplication time-domain OFDM signal generated by the signal-by-function multiplication section and provided with a guide interval added by the interval-to-signal addition section as a portion starting from an FFT window position determined by the position determination section in order to transform the post-multiplication time-domain OFDM signal into the frequency-domain OFDM signal.

The signal-by-function multiplication section is capable of deriving a new window function, which has a value of 0 over a time segment starting from the start position of the new window function and having a length equal to the delay spread and has a value of 1 over an extension time segment also having a length equal to the delay spread, from an original window function given in advance as a standard window function having:

a total length equal to the length of the OFDM symbol;

a value varying in the range 0 to 1 in time segments included in the total length as a time segment corresponding to the guide interval and a time segment corresponding to a signal serving as a source from which the guide interval is copied; and a value of 1 in another time segment also included in the total length as a time segment to be extended by the extension time segment.

The delay-spread computation section computes a delay spread on the basis of a delay profile inferred by the profile inference section by finding a time distance between an earliest arriving wave and a latest arriving wave.

In accordance with another mode of the present invention, there are provided a signal receiving method and a program implementing the signal receiving method which includes:

a profile inference step of inferring a delay profile from a frequency-domain OFDM signal;

a delay-spread computation step of computing a delay spread on the basis of a delay profile inferred at the profile inference step;

a position determination step of determining an FFT window position by making use of a time-domain OFDM signal or a delay profile inferred at the profile inference step;

a signal-by-function multiplication step of multiplying a window function formed on the basis of a delay spread computed at the delay-spread computation step and an FFT window position determined at the position determination step by a time-domain OFDM signal representing one OFDM symbol in order to generate a post-multiplication time-domain OFDM signal;

an interval extraction step of extracting a guide interval from a post-multiplication time-domain OFDM signal generated at the signal-by-function multiplication step;

an interval-to-signal addition step of adding a guide interval extracted at the interval extraction step to a portion included in a post-multiplication time-domain OFDM signal generated at the signal-by-function multiplication step as a portion starting from a position leading ahead of the end position of an OFDM symbol represented by the post-multiplication time-domain OFDM signal along the time axis by a time distance equal to a difference obtained as a result of subtracting a time segment corresponding to a delay spread computed at the delay-spread computation step from the time segment of the guide interval; and a signal processing step of carrying out an FFT process on a portion included in a post-multiplication time-domain OFDM signal generated at the signal-by-function multiplication step and provided with a guide interval added at the interval-to-signal addition step as a portion starting from an FFT window position determined at the position determination step in order to transform the post-multiplication time-domain OFDM signal into the frequency-domain OFDM signal.

In accordance with the modes of the present invention:

a delay profile is inferred from a frequency-domain OFDM signal;

a delay spread is computed on the basis of the delay profile;

an FFT window position is determined by making use of a time-domain OFDM signal or the delay profile;

a window function formed on the basis of the delay spread and the FFT window position is multiplied by a time-domain OFDM signal representing one OFDM symbol in order to generate a post-multiplication time-domain OFDM signal;

a guide interval is extracted from the post-multiplication time-domain OFDM;

the guide interval is added to a portion included in the post-multiplication time-domain OFDM signal as a portion starting from a position leading ahead of the end position of an OFDM symbol represented by the post-multiplication time-domain OFDM signal along the time axis by a time distance equal to a difference obtained as a result of subtracting a time segment corresponding to the delay spread from the time segment of the guide interval; and an FFT process is carried out on a portion included in the post-multiplication time-domain OFDM signal including the added guide interval as a portion starting from the FFT window position in order to transform the post-multiplication time-domain OFDM signal into the frequency-domain OFDM signal.

In accordance with the modes of the present invention, it is possible to easily carry out an OFDM demodulation process making use of a window function without causing occurrence of an ISI even in a multipath environment.

BRIEF DESCRIPTION OF THE DRAWINGS

These and other aims and features of the embodiments of the present invention will become clear from the following description of the preferred embodiments given with reference to the accompanying diagrams, in which:

FIG. 8A is a diagram showing a time-domain OFDM signal representing one OFDM symbol; FIG. 8B is a diagram showing a trapezoidal window function; FIG. 8C is a diagram showing a protruding window function; FIG. 8D is a diagram showing a raised cosine window function;

FIG. 10A is a diagram showing a time-domain OFDM signal representing one OFDM symbol; FIG. 10B is a diagram showing the trapezoidal window function; FIG. 10C is a diagram showing a time-domain OFDM signal supplied to a 2N-point FFT processing circuit employed in the FFT circuit shown in the block diagram of FIG. 7;

FIG. 15 is a plurality of diagrams to be referred to in description of typical demodulation processes carried out by a variety of circuits employed in the FFT circuit shown in the block diagram of FIG. 14; FIG. 15A is a diagram showing a time-domain OFDM signal representing one OFDM symbol; FIG. 15B is a diagram showing a trapezoidal window function reshaped by a window-function utilization circuit employed in the FFT circuit shown in the block diagram of FIG. 14;

FIG. 16 is a plurality of explanatory diagrams to be referred to in description of typical demodulation processes carried out by circuits employed in the FFT circuit shown in the block diagram of FIG. 14.

FIG. 19 is a block diagram showing a typical hardware configuration of a personal computer.

DETAILED DESCRIPTION OF THE PREFERRED EMBODIMENTS

Figure 12:
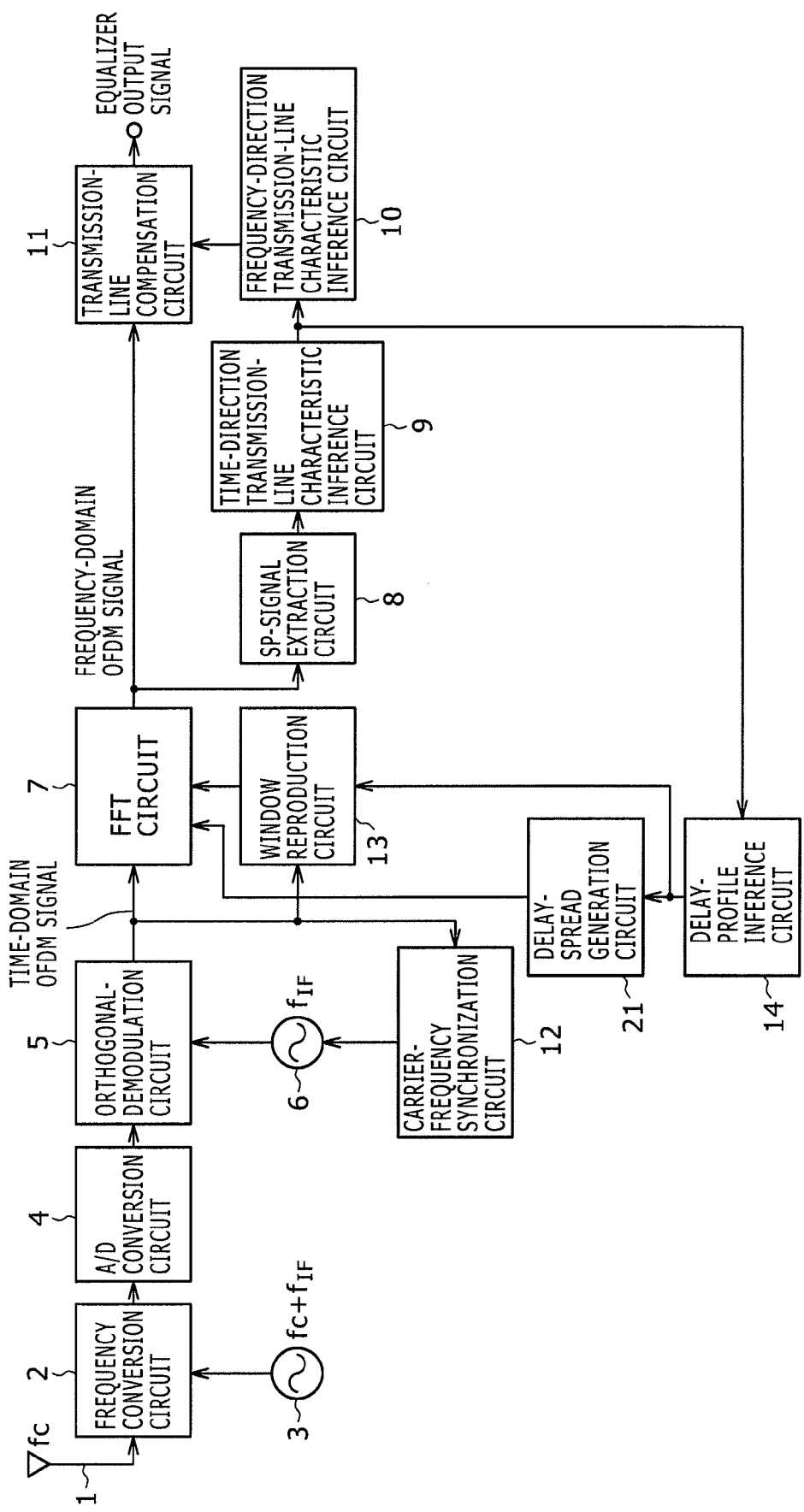
FIG. 12 is a block diagram showing a typical configuration of an OFDM receiver according to an embodiment of the present invention.

FIG. 12 is a block diagram showing a typical configuration of an OFDM receiver according to an embodiment of the present invention. Configuration elements employed in this OFDM receiver as elements identical with their counterparts employed in the existing OFDM receiver shown in the block diagram of FIG. 3 are denoted by the same reference numerals as the counterparts.

As shown in the block diagram of FIG. 12, the OFDM receiver according to an embodiment of the present invention employs an antenna 1, a frequency conversion circuit 2, a local oscillation circuit 3, an A/D conversion circuit 4, a orthogonal-demodulation circuit 5, a local oscillation circuit 6, an FFT circuit 7, an SP-signal extraction circuit 8, a time-direction transmission-line characteristic inference circuit 9, a frequency-direction transmission-line characteristic inference circuit 10, a transmission-line compensation circuit 11, a carrier-frequency synchronization circuit 12, a window reproduction circuit 13, a delay-profile inference circuit 14 and a delay-spread generation circuit 21.

Figure 1:
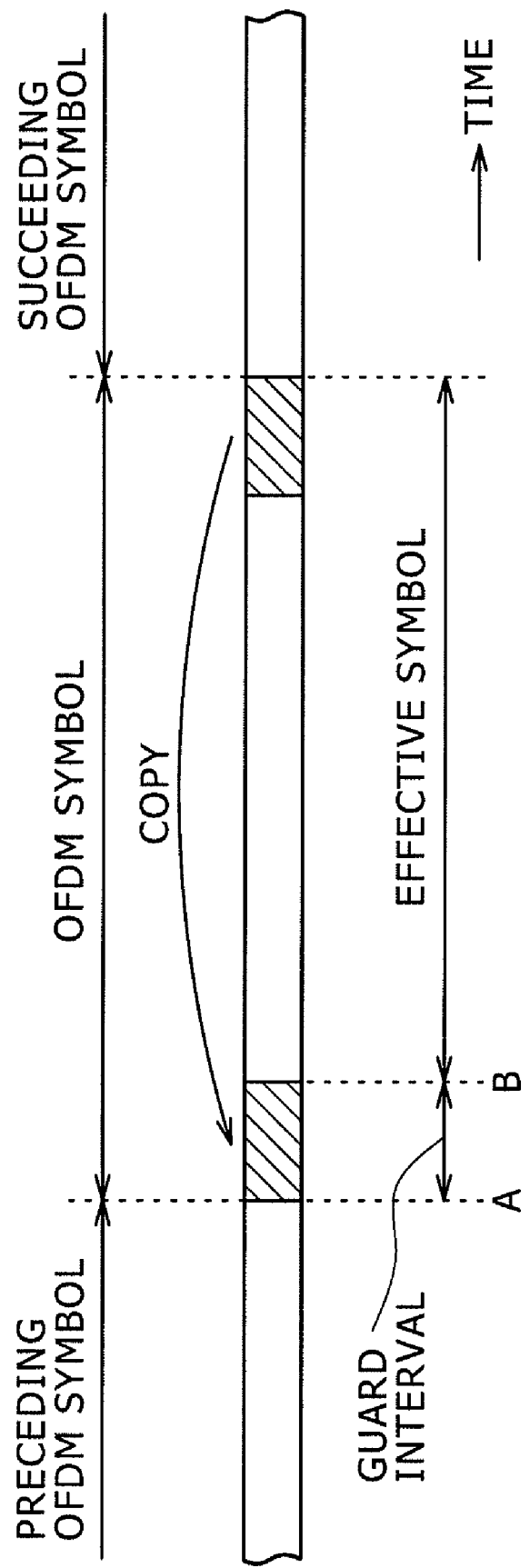
FIG. 1 is a diagram showing a sequence of OFDM symbols.
Figure 2:
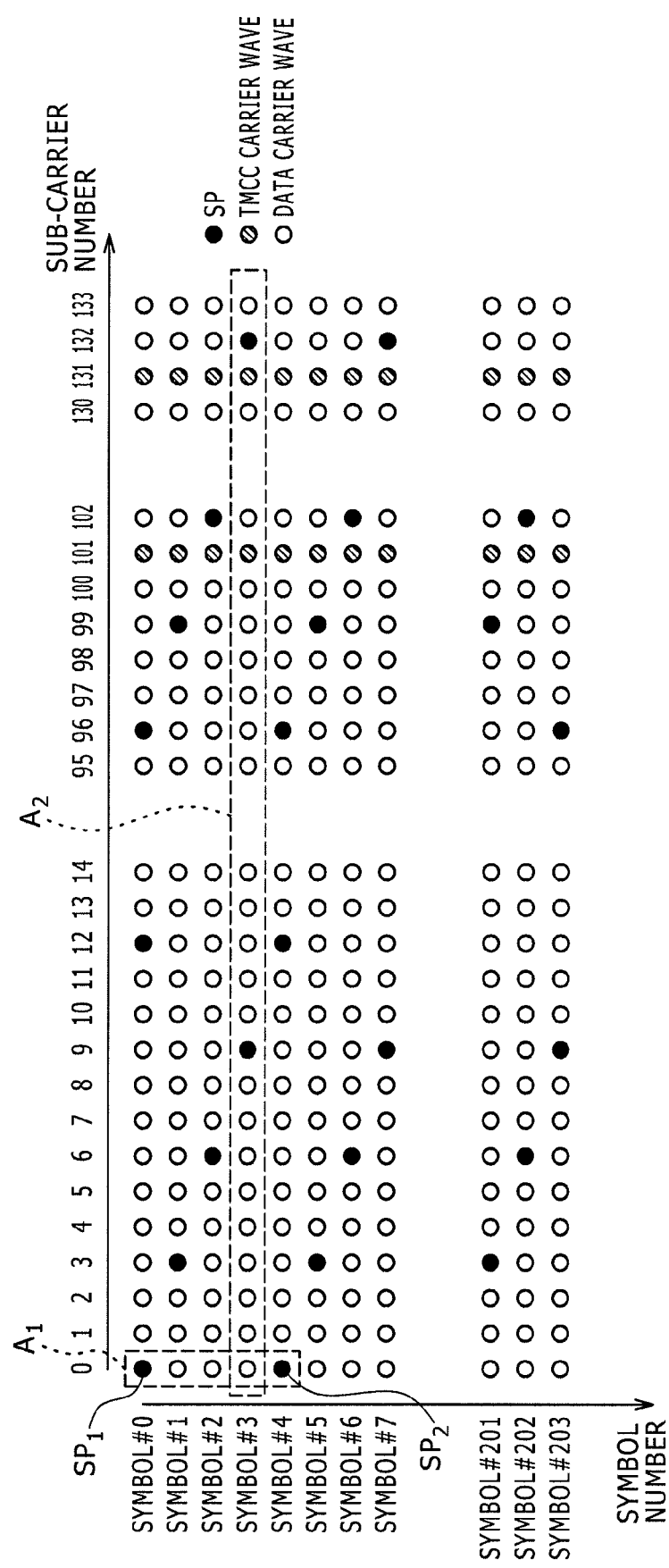
FIG. 2 is a diagram showing a typical layout of SP signals.
Figure 3:
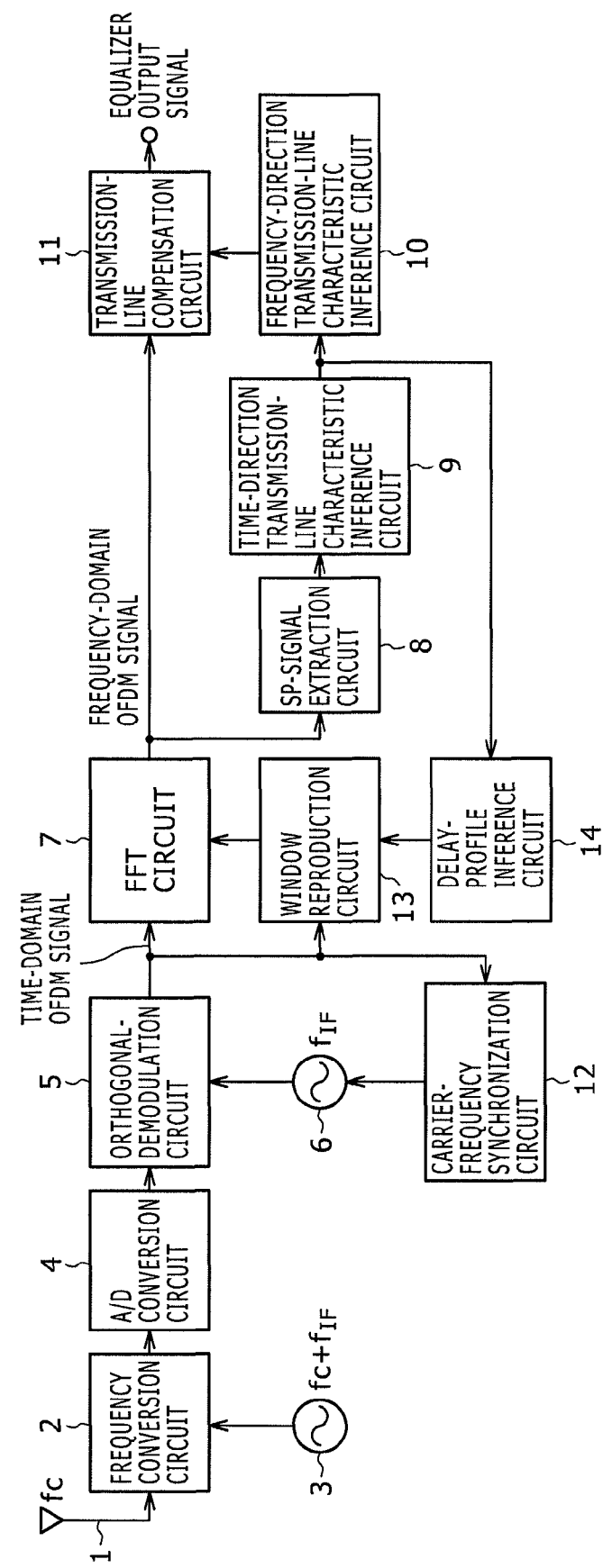
FIG. 3 is a block diagram showing a typical configuration of the existing OFDM receiver.
Figure 4:
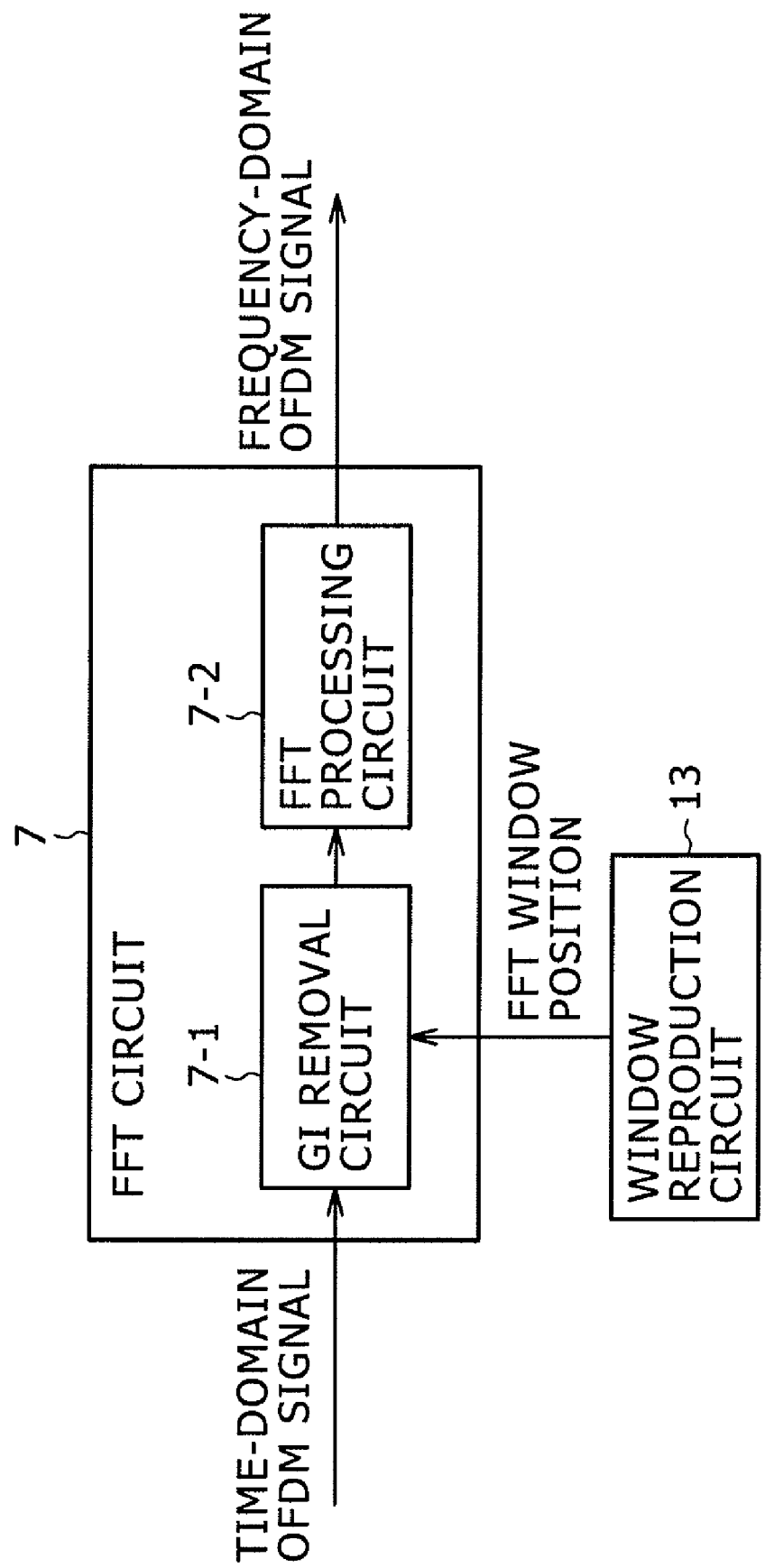
FIG. 4 is a block diagram showing a typical configuration of an FFT circuit employed in the existing OFDM receiver shown in the block diagram of FIG. 3.
Figure 5:
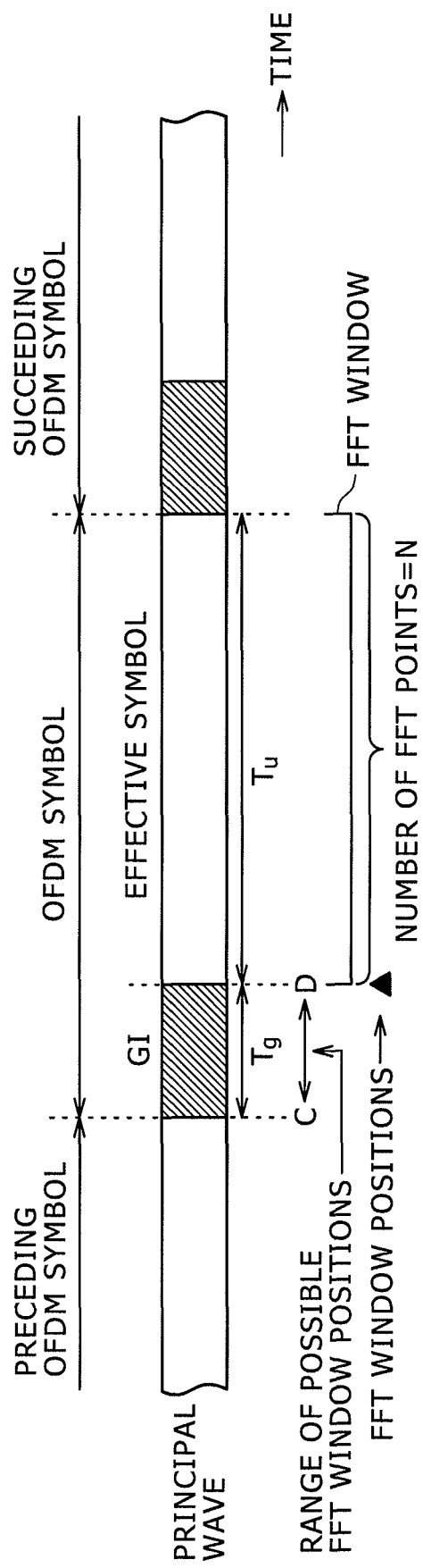
FIG. 5 is a diagram showing a typical FFT window position in a 1-wave environment.
Figure 6:
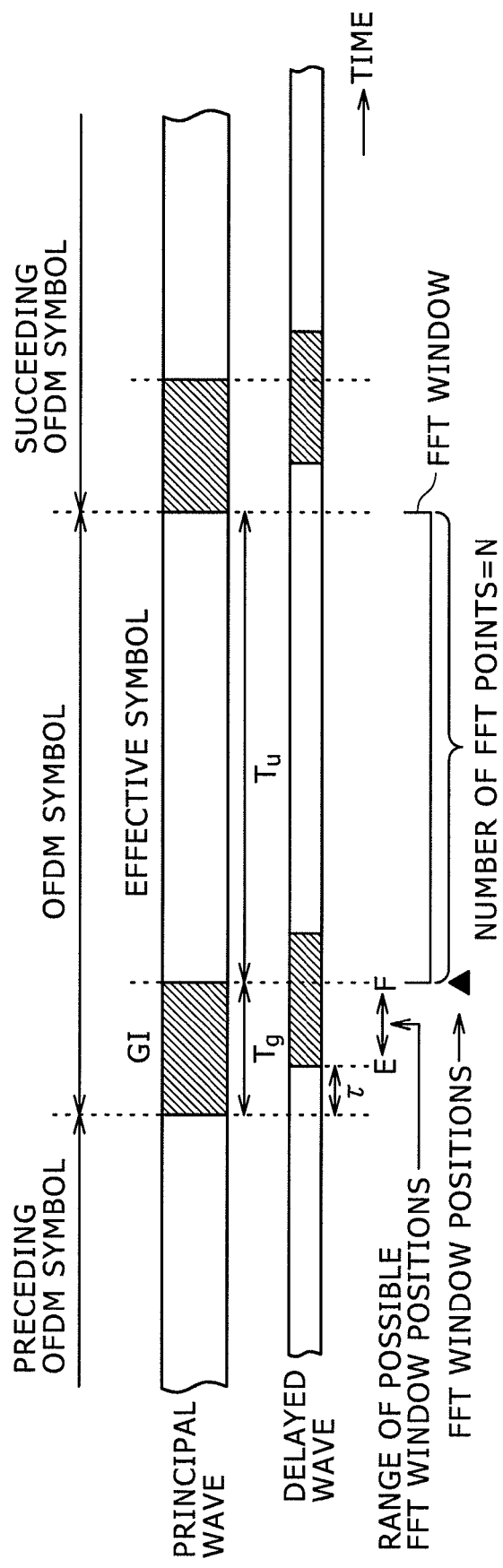
FIG. 6 is a diagram showing a typical FFT window position in a multipath environment.
Figure 7:
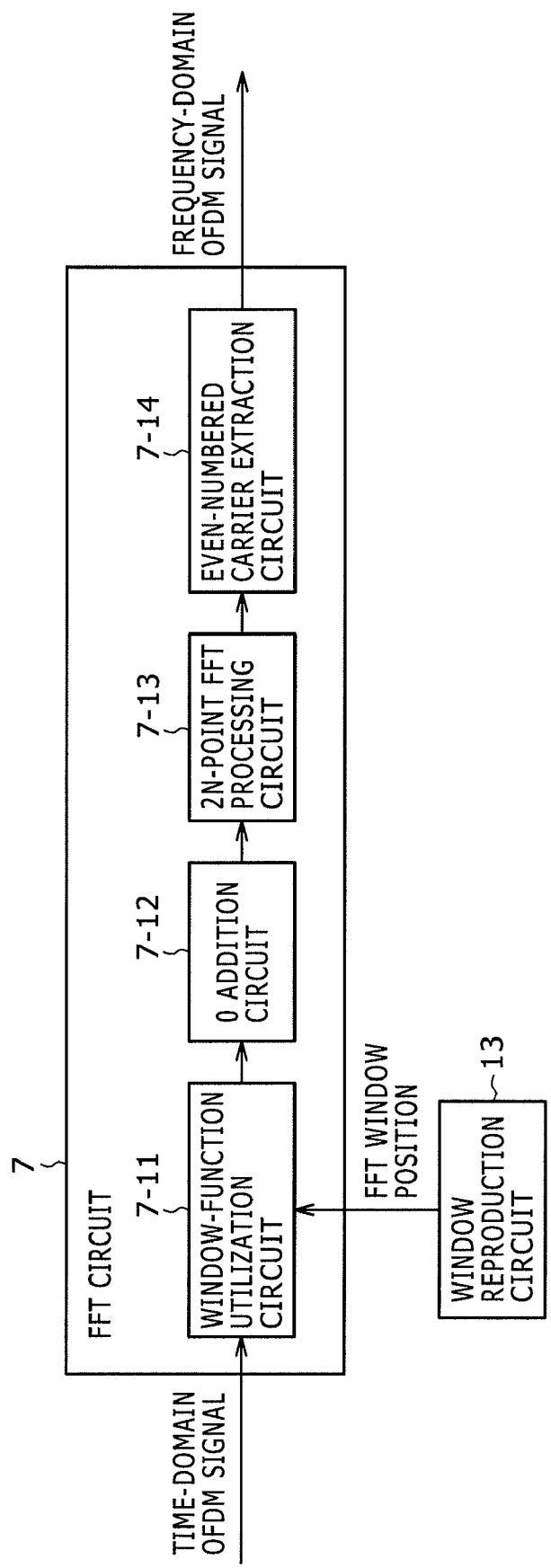
FIG. 7 is a block diagram showing a typical configuration of an FFT circuit for carrying out an OFDM demodulation process making use of a window function.

That is to say, the OFDM receiver shown in the block diagram of FIG. 12 as the OFDM receiver according to an embodiment of the present invention is different from the existing OFDM receiver shown in the block diagram of FIG. 3 in that the OFDM receiver according to an embodiment further employs the delay-spread generation circuit 21.

The frequency conversion circuit 2 employed in the OFDM receiver shown in the block diagram of FIG. 12 is a section for multiplying an RF signal received from the antenna 1 by a carrier wave received from the local oscillation circuit 3 as a carrier wave with an oscillation frequency of $(f_c+f_{IF})$ in order to convert the RF signal into an IF signal having a center frequency $f_{IF}$ and for outputting the IF signal obtained as a result of the frequency conversion process to the A/D conversion circuit 4.

The A/D conversion circuit 4 is a section for carrying out an A/D conversion process of converting the analog IF signal received from the frequency conversion circuit 2 into a digital IF signal and outputting the digital IF signal obtained as a result of the A/D conversion process to the orthogonal-demodulation circuit 5.

The orthogonal-demodulation circuit 5 is a section for carrying out an orthogonal demodulation process making use of a carrier wave received from the local oscillation circuit 6 as a carrier wave having the frequency $f_{IF}$ in order to acquire a baseband OFDM signal from the digital IF signal supplied by the A/D conversion circuit 4. The baseband OFDM signal is the so-called time-domain OFDM signal not subjected yet to an FFT process. The orthogonal-demodulation circuit 5 outputs the time-domain OFDM signal obtained as a result of the orthogonal demodulation process to the carrier-frequency synchronization circuit 12, the FFT circuit 7 and the window reproduction circuit 13.

The FFT circuit 7 is a section for forming a window function on the basis of an FFT window position specified by the window reproduction circuit 13 as well as a delay spread computed by the delay-spread generation circuit 21 and multiplying the window function by a time-domain OFDM signal received from the orthogonal-demodulation circuit 5 in order to generate a post-multiplication time-domain OFDM signal including N samples to be used as a subject of an FFT process.

The FFT circuit 7 is also a section for carrying out an FFT process on the generated post-multiplication time-domain OFDM signal including N samples as a demodulation process in order to generate a post-demodulation OFDM signal and outputting the generated post-demodulation OFDM signal to the SP-signal extraction circuit 8 and the transmission-line compensation circuit 11. The post-demodulation OFDM signal generated by the FFT circuit 7 is the so-called frequency-domain OFDM signal which is obtained as a result of the FFT process.

The SP-signal extraction circuit 8 is a section for extracting an SP signal from the frequency-domain OFDM signal received from the FFT circuit 7 and removing modulation components from the extracted SP signal in order to infer a transmission-line characteristic prevailing at the position of an OFDM symbol associated with the SP signal as a transmission-line characteristic of a sub-carrier wave. The SP-signal extraction circuit 8 outputs a signal representing the transmission-line characteristic of the sub-carrier wave to the time-direction transmission-line characteristic inference circuit 9.

The time-direction transmission-line characteristic inference circuit 9 is a section for inferring transmission-line characteristics prevailing at positions of other OFDM symbols lined up in the time-axis direction (which is also referred to as an OFDM-symbol direction) in an area between the positions of specific OFDM symbols each associated with an SP signal as transmission-line characteristics of a sub-carrier wave on the basis of the transmission-line characteristics inferred by the SP-signal extraction circuit 8 as the transmission-line characteristics which prevail at the positions of the specific OFDM symbols as the transmission-line characteristics of the sub-carrier wave. The time-direction transmission-line characteristic inference circuit 9 outputs a signal representing transmission-line characteristics inferred thereby to the frequency-direction transmission-line characteristic inference circuit 10 and the delay-profile inference circuit 14. The transmission-line characteristics represented by the signal output by the time-direction transmission-line characteristic inference circuit 9 includes the transmission-line characteristics inferred by the SP-signal extraction circuit 8.

The frequency-direction transmission-line characteristic inference circuit 10 is a section for inferring transmission-line characteristics prevailing at positions of OFDM symbols lined up in the frequency direction (which is also referred to as a sub-carrier direction) as transmission-line characteristics of sub-carrier waves on the basis of transmission-line characteristics output by the time-direction transmission-line characteristic inference circuit 9. As a result, the transmission-line characteristics prevailing at the positions of all OFDM symbols as transmission-line characteristics of sub-carrier waves are inferred. The frequency-direction transmission-line characteristic inference circuit 10 outputs a signal representing the inferred transmission-line characteristics to the transmission-line compensation circuit 11.

The transmission-line compensation circuit 11 is a section for removing distortion components, which are included in the frequency-domain OFDM signal received from the FFT circuit 7 as components attributed to distortions occurring along the transmission line, by making use of transmission-line characteristics output by the frequency-direction transmission-line characteristic inference circuit 10. The transmission-line compensation circuit 11 outputs a frequency-domain OFDM signal including no distortion components to circuits at a stage succeeding this OFDM receiver as an equalizer output signal.

The carrier-frequency synchronization circuit 12 is a section for controlling the local oscillation circuit 6 on the basis of the time-domain OFDM signal received from the orthogonal-demodulation circuit 5 in order to drive the local oscillation circuit 6 to output a carrier wave having an oscillation frequency $f_{IF}$ to the orthogonal-demodulation circuit 5.

The window reproduction circuit 13 is a section for determining an FFT window position on the basis of the time-domain OFDM signal received from the orthogonal-demodulation circuit 5 or a delay profile received from the delay-profile inference circuit 14 and outputting a signal specifying the determined FFT window position to the FFT circuit 7.

If the window reproduction circuit 13 determines an FFT window position on the basis of the time-domain OFDM signal received from the orthogonal-demodulation circuit 5 for example, first of all, the window reproduction circuit 13 finds correlations between parts and a later portion included in an effective symbol of a time-domain OFDM signal representing one OFDM symbol as a portion used as a source from which the GI of the OFDM symbol is copied. Then, the window reproduction circuit 13 detects a part with a high correlation as the GI. Finally, the window reproduction circuit 13 determines a position on the border between the detected GI and the effective symbol as an FFT window position.

If the window reproduction circuit 13 determines an FFT window position on the basis of a delay profile received from the delay-profile inference circuit 14, on the other hand, the window reproduction circuit 13 determines a position, which is represented by the delay profile as a position on the border between the detected GI and the effective symbol, as an FFT window position.

The delay-profile inference circuit 14 is a section for inferring a delay profile of the transmission line by finding a time response characteristic of the transmission line and outputting a signal representing the inferred delay profile to the window reproduction circuit 13 and the delay-spread generation circuit 21.

The delay-spread generation circuit 21 is a section for computing a delay spread on the basis of a delay profile inferred by the delay-profile inference circuit 14 and outputting a signal representing the computed delay spread to the FFT circuit 7.

Figure 13:
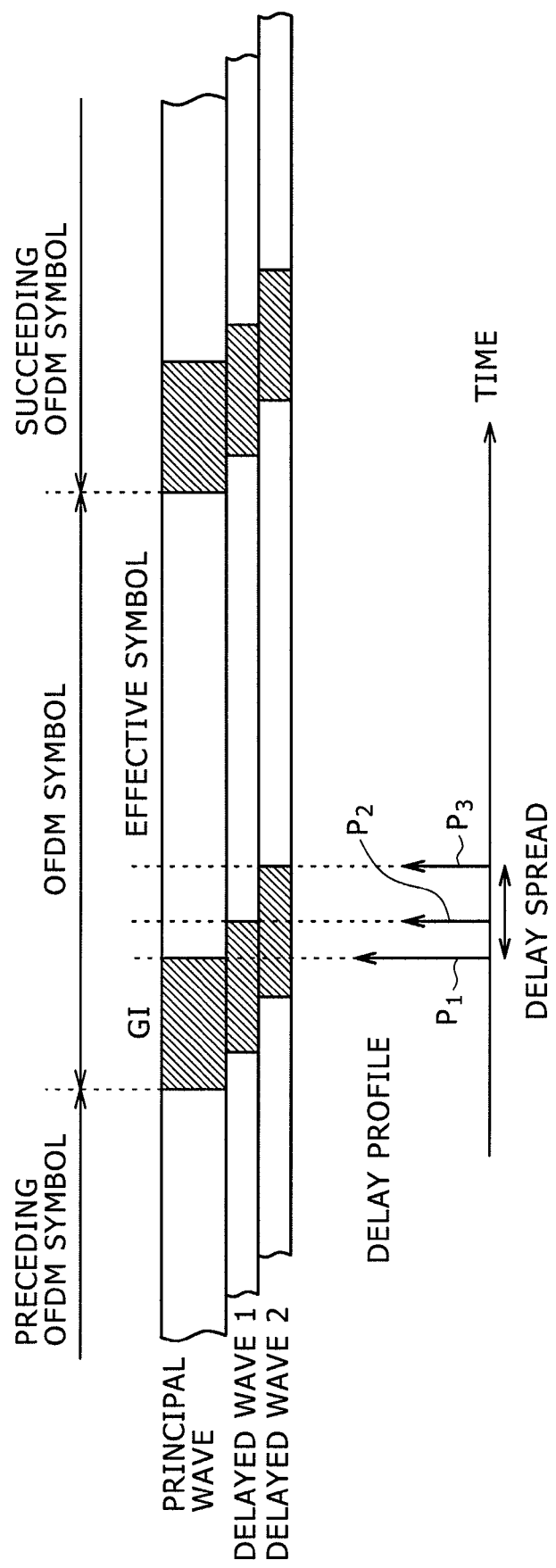
FIG. 13 is an explanatory diagram to be referred to in description of a typical delay spread computed by a delay-spread generation circuit employed in the OFDM receiver shown in the block diagram of FIG. 12.

FIG. 13 is an explanatory diagram referred to in description of a typical delay spread computed by the delay-spread generation circuit 21.

The typical delay spread is described for a case in which the OFDM receiver receives a compound wave consisting of the principal wave, which serves as a direct wave, and delayed waves 1 and 2 each delayed from the principal wave by a delay time determined in advance. Each of the delayed waves has an attenuated amplitude.

Delay profiles $P_1$ to $P_3$ are displayed along the time axis in the lower part of the explanatory diagram of FIG. 13. The delay profile $P_1$ represents a position on the boundary between the GI of an OFDM symbol shown at the center of the explanatory diagram of FIG. 13 and the effective symbol included in the same OFDM symbol as the GI. The delay profile $P_2$ represents a position on the boundary between the GI of an OFDM symbol represented by delayed wave 1 delayed from the principal wave by a delay time determined in advance and the effective symbol included in the same OFDM symbol as the GI. The delay profile $P_3$ represents a position on the boundary between the GI of an OFDM symbol represented by delayed wave 2 further delayed from delayed wave 1 by a delay time determined in advance and the effective symbol included in the same OFDM symbol as the GI.

On the basis of the delay profiles inferred by the delay-profile inference circuit 14 as described above, the delay-spread generation circuit 21 takes a time distance between an earliest arriving wave and a latest arriving wave as a delay spread. To put it concretely, in the case of the delay profiles P1 to P3 shown in the explanatory diagram of FIG. 13, as a delay spread, the delay-spread generation circuit 21 takes a time distance between the delay profile P1 of the principal wave serving as an earliest arriving wave and the delay profile P3 of delayed wave 2 serving as a latest arriving wave.

Figure 14:
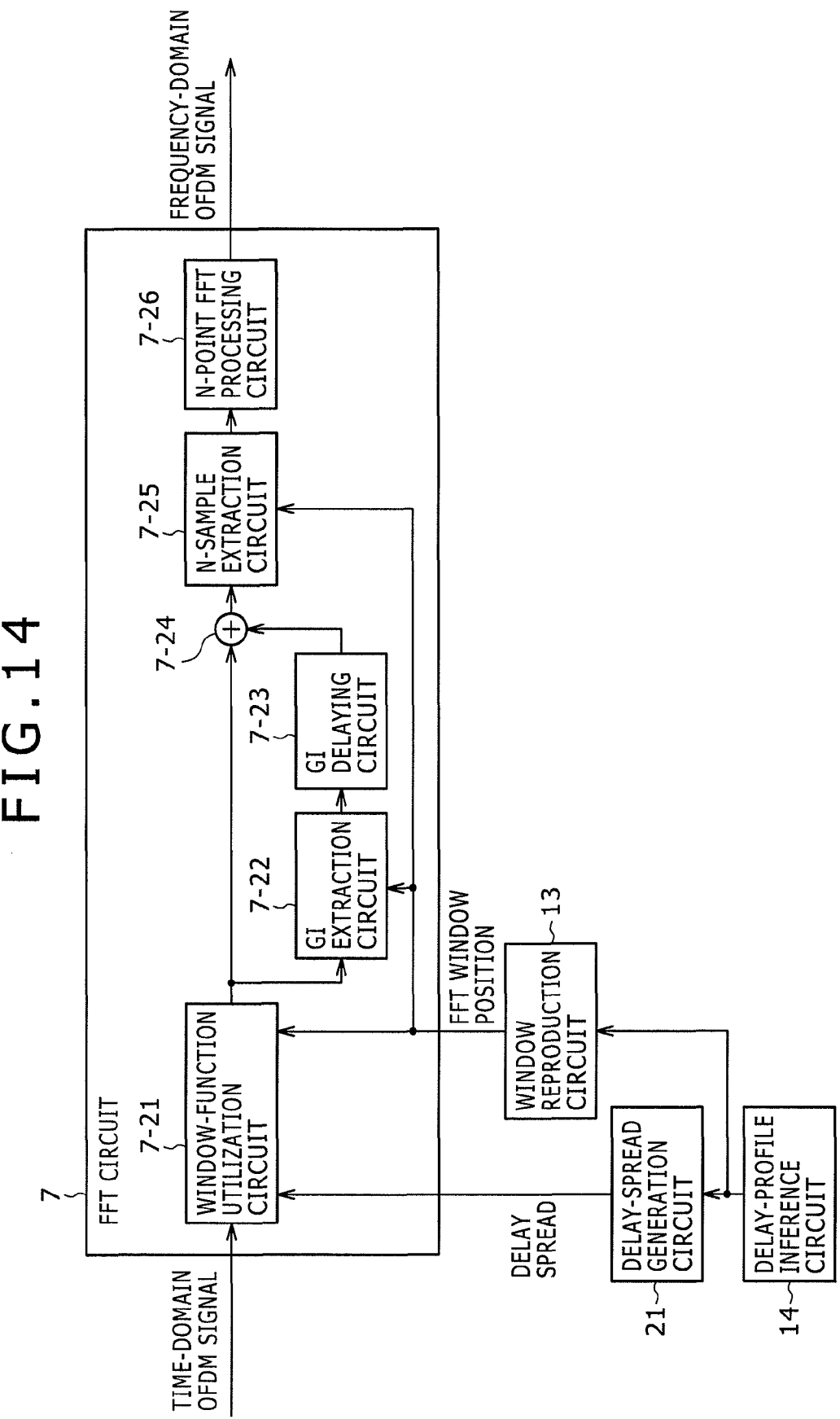
FIG. 14 is a block diagram showing a typical configuration of an FFT circuit employed in the OFDM receiver shown in the block diagram of FIG. 12.

FIG. 14 is a block diagram showing a typical configuration of the FFT circuit 7 employed in the OFDM receiver shown in the block diagram of FIG. 12.

As shown in the block diagram of FIG. 14, the FFT circuit 7 employs a window-function utilization circuit 7-21, a GI extraction circuit 7-22, a GI delaying circuit 7-23, a GI-to-signal addition circuit 7-24, an N-sample extraction circuit 7-25 and an N-point FFT processing circuit 7-26.

A signal generated by the window reproduction circuit 13 employed in the OFDM receiver shown in the block diagram of FIG. 12 as a signal specifying an FFT window position is supplied to the window-function utilization circuit 7-21, the GI extraction circuit 7-22 and the N-sample extraction circuit 7-25. On the other hand, a signal generated by the delay-spread generation circuit 21 employed in the OFDM receiver shown in the block diagram of FIG. 12 as a signal representing a delay spread is supplied to the window-function utilization circuit 7-21. The window-function utilization circuit 7-21 also receives a time-domain OFDM signal from the orthogonal-demodulation circuit 5 employed in the OFDM receiver shown in the block diagram of FIG. 12.

Figure 8:
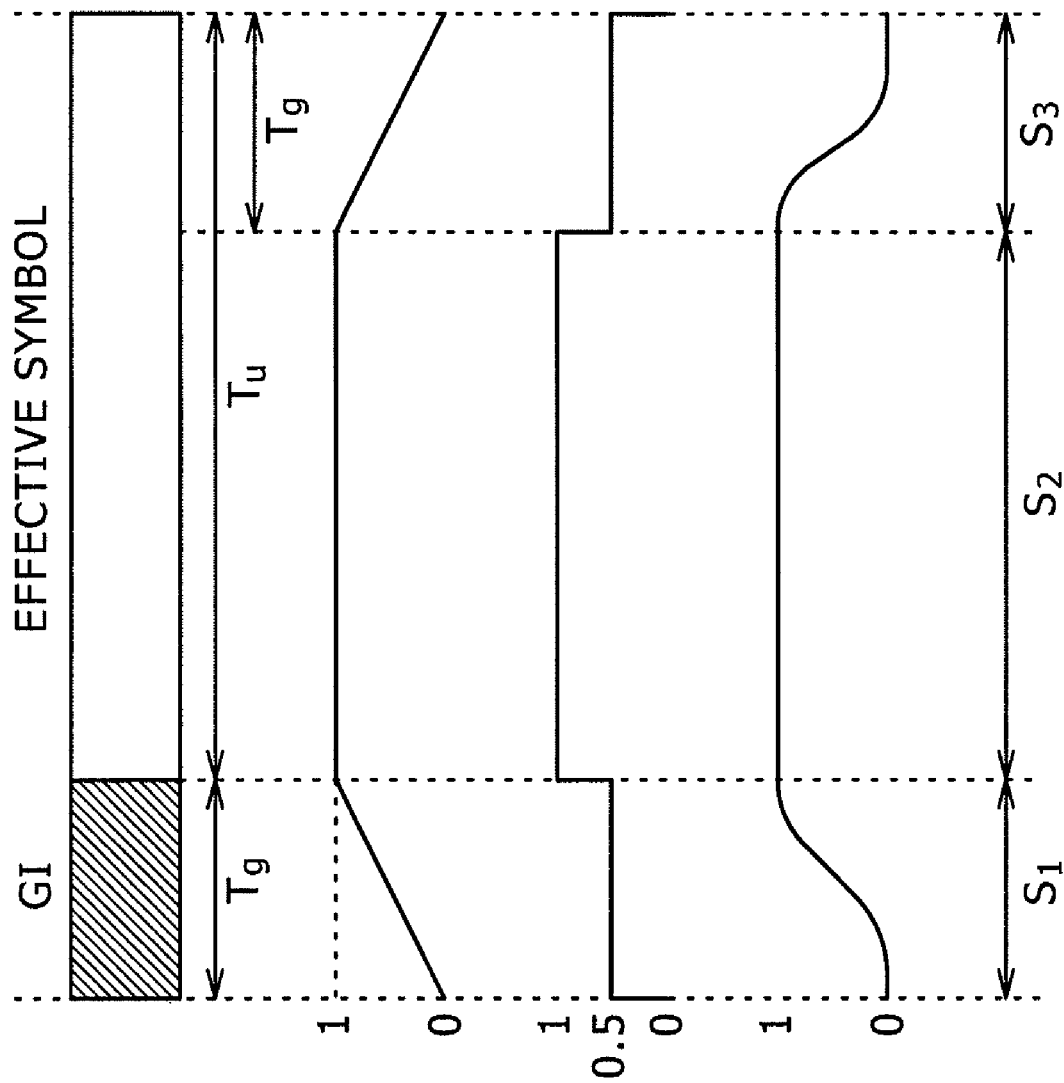
FIG. 8 is a plurality of diagrams showing a time-domain OFDM signal and typical window functions.
Figure 9:
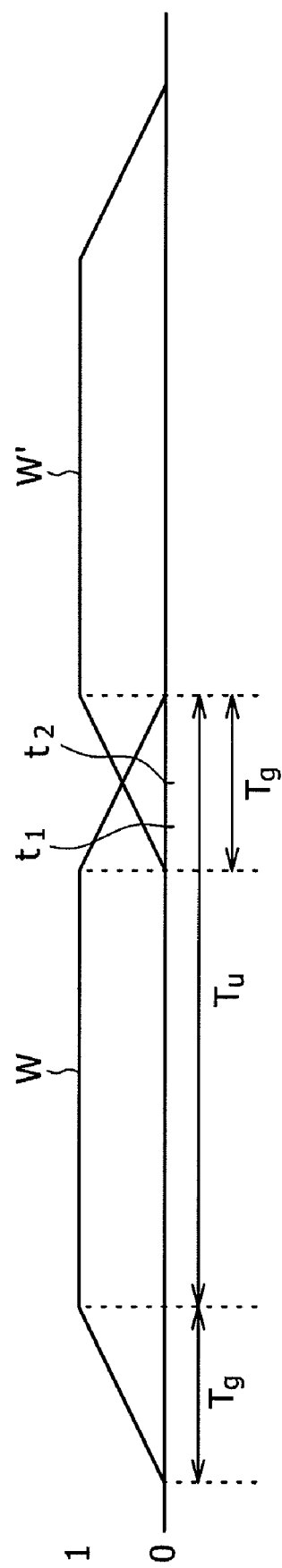
FIG. 9 is an explanatory diagram to be referred to in explanation of a characteristic of the window functions.
Figure 10:
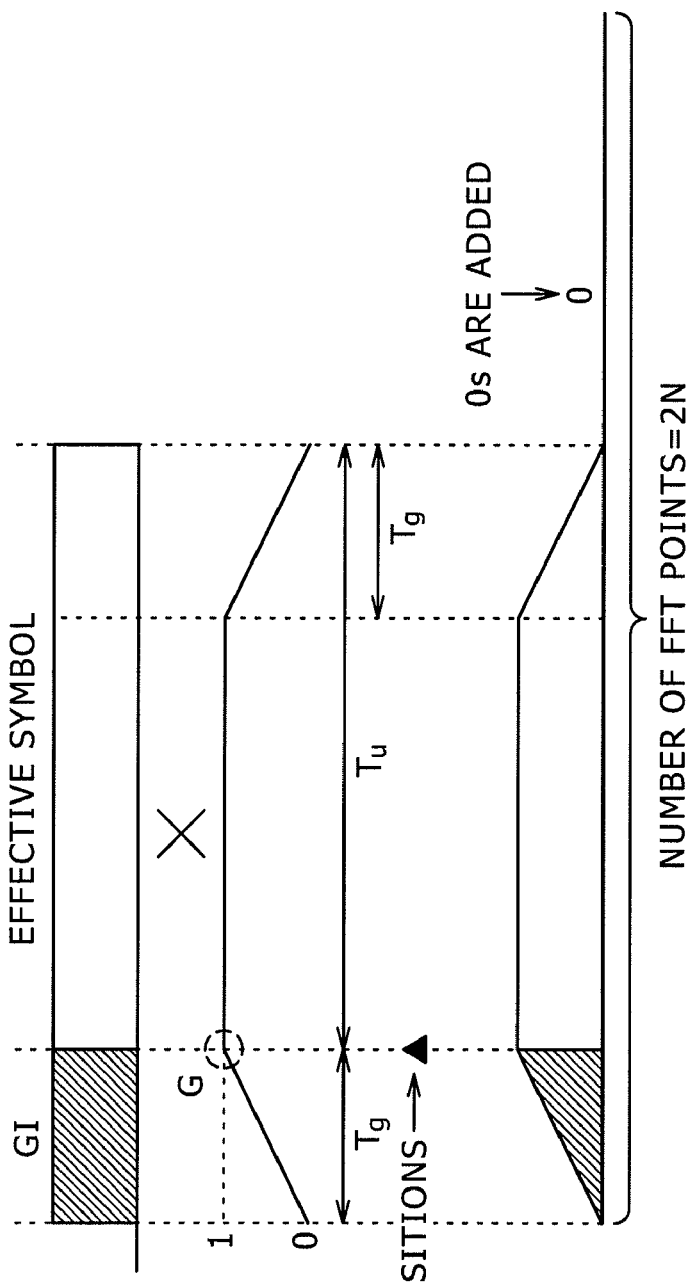
FIG. 10 is a plurality of explanatory diagrams each referred to in description of an OFDM demodulation process carried out by making use of the trapezoidal window function shown in the diagram of FIG. 8B.

The window-function utilization circuit 7-21 is a section for forming a window function on the basis of an FFT window position specified by the window reproduction circuit 13 and a delay spread computed by the delay-spread generation circuit 21. The window-function utilization circuit 7-21 is provided in advance with standard window functions like the ones each shown in one of the diagrams of FIG. 8 as a window function to be subjected to a reshaping process of generating a reshaped window function.

The window-function utilization circuit 7-21 multiplies a time-domain OFDM signal received from the orthogonal-demodulation circuit 5 by a reshaped window function in order to produce a weighted time-domain OFDM signal as a result of the multiplication operation. The window-function utilization circuit 7-21 supplies the weighted time-domain OFDM signal obtained as a result of the multiplication operation to the GI extraction circuit 7-22 and the GI-to-signal addition circuit 7-24.

The GI extraction circuit 7-22 is a section for extracting a GI from a time-domain OFDM signal received from the window-function utilization circuit 7-21 on the basis of an FFT window position specified by the window reproduction circuit 13 and outputting the extracted GI to the GI delaying circuit 7-23.

The GI delaying circuit 7-23 is a section for delaying a GI received from the GI extraction circuit 7-22 by an effective-symbol length Tu in preparation for an operation to be carried out by the GI-to-signal addition circuit 7-24 described below to add the delayed GI to a later portion of an effective symbol included in the same OFDM symbol as the GI. The GI delaying circuit 7-23 outputs the delayed GI to the GI-to-signal addition circuit 7-24.

The GI-to-signal addition circuit 7-24 is a section for adding a GI received from the GI delaying circuit 7-23 to a later portion of an effective symbol included in the same OFDM symbol represented by a time-domain OFDM signal received from the window-function utilization circuit 7-21 as the GI. The GI-to-signal addition circuit 7-24 outputs a time-domain OFDM signal obtained as a result of the addition operation to the N-sample extraction circuit 7-25.

The N-sample extraction circuit 7-25 is a section for extracting N samples located at positions following an FFT window position specified by the window reproduction circuit 13 from a time-domain OFDM signal received from the GI-to-signal addition circuit 7-24 where notation N denotes the number of samples included in the effective symbol represented by the time-domain OFDM signal. The N-sample extraction circuit 7-25 outputs a time-domain OFDM signal representing the extracted N samples to the N-point FFT processing circuit 7-26.

The N-point FFT processing circuit 7-26 is a section for carrying out an FFT process on a time-domain OFDM signal received from the N-sample extraction circuit 7-25 as a time-domain OFDM signal representing the extracted N samples in order to transform the time-domain OFDM signal into a frequency-domain OFDM signal. The N-point FFT processing circuit 7-26 outputs the frequency-domain OFDM signal obtained as a result of the FFT process to the SP-signal extraction circuit 8 and the transmission-line compensation circuit 11 which are employed in the OFDM receiver shown in the diagram of FIG. 12.

Each of FIGS. 15 and 16 is a plurality of diagrams referred to in description of typical OFDM demodulation processes carried out by the circuits employed in the FFT circuit 7 shown in the block diagram of FIG. 14.

To be more specific, FIG. 15A is a diagram showing a time-domain OFDM signal representing one OFDM symbol whereas FIG. 15B is a diagram showing a trapezoidal window function reshaped by the window-function utilization circuit 7-21.

In the case of the FFT circuit 7 shown in the block diagram of FIG. 14, the trapezoidal window function shown in the diagram of FIG. 8B has been given in advance to the window-function utilization circuit 7-21 as a standard window function. This standard trapezoidal window function is reshaped in order to create the trapezoidal window function shown in the diagram of FIG. 15B as described below. It is to be noted that each of other standard trapezoidal window functions like the ones shown in the diagrams of FIGS. 8C and 8D can be reshaped in the same way. It is also worth noting that, in the operation to reshape each of the standard window functions, the FFT window position specified by the window reproduction circuit 13 is a point H which is a point on the border between the GI and the effective symbol as shown in the diagram of FIG. 15B. Notation $\tau$ shown in the diagram of FIG. 15B denotes a delay spread computed by the delay-spread generation circuit 21.

In the diagrams of FIG. 15, a time segment $S_{21}$ is a time segment which begins from the start point of the post-reshaping trapezoidal window function shown in the diagram of FIG. 15B and ends at a point lagging behind the start point by a delay time equivalent to the delay spread $\tau$. A time segment $S_{22}$ is a time segment which starts from the point lagging behind the start point by a delay time equivalent to the delay spread $\tau$ and ends at the border between the GI and the effective symbol. A time segment $S_{23}$ is a time segment which starts from the border between the GI and the effective symbol and ends at a point leading ahead of the end point of the effective symbol by a time distance of $(Tg-\tau)$ where notation Tg denotes the width of the GI. A time segment $S_{24}$ is a time segment which starts from the point leading ahead of the end point of the effective symbol by the time distance of $(Tg-\tau)$ and terminates at the end point of the effective symbol.

Figure 11:
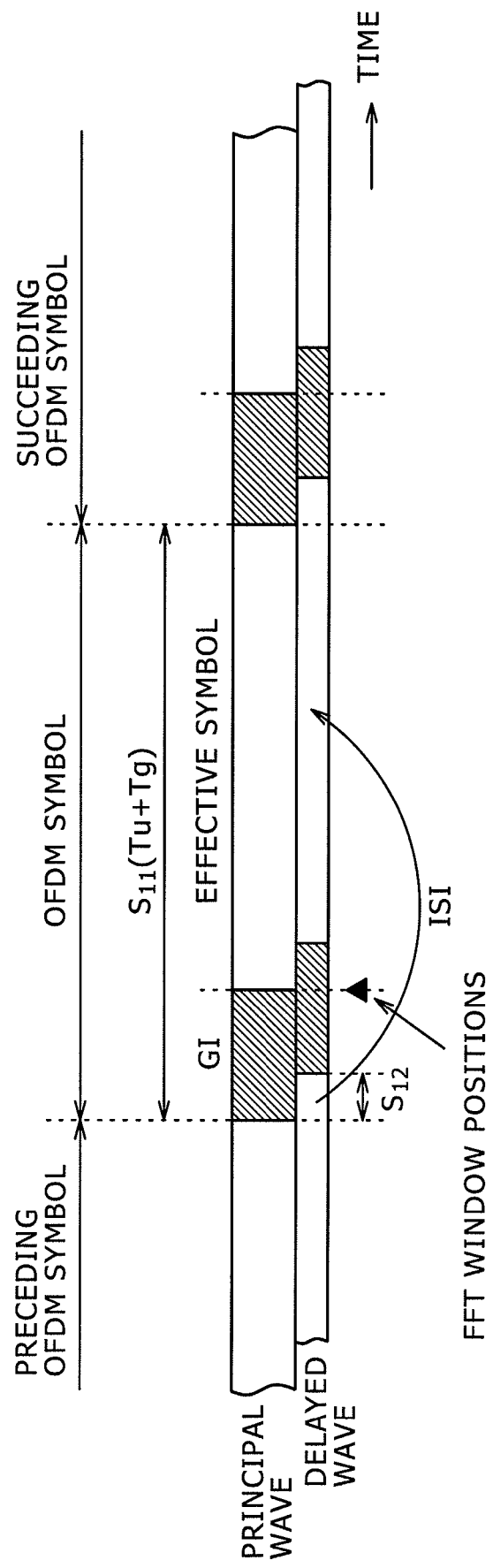
FIG. 11 is an explanatory diagram to be referred to in description of a typical OFDM demodulation process carried out in a multipath environment.

As shown in the diagram of FIG. 15B, the post-reshaping trapezoidal window function has a value of 0 throughout the time segment $S_{21}$ and a value increasing from 0 to 1 along a straight line over the time segment $S_{22}$. That is to say, the time segment $S_{21}$ providing the window-function value of 0 is set at the head of the post-reshaping trapezoidal window function in order to shift the pre-reshaping trapezoidal window function in the time lapsing direction along the time axis so that a time segment potentially causing an ISI is excluded from the subject of the FFT process. The time segment potentially causing an ISI is the time segment S12 shown in the explanatory diagram of FIG. 11 as a time segment of a delayed wave. By setting the time segment $S_{21}$ at the head of the post-reshaping trapezoidal window function in this way, the gradient of the straight line over the time segment $S_{22}$ becomes larger than the gradient of the straight line over the time segment $S_1$ of the standard trapezoidal window function shown in the diagram of FIG. 8B.

The post-reshaping trapezoidal window function has a value of 1 throughout the time segment $S_{23}$ and a value decreasing from 1 to 0 along a straight line over the time segment $S_{24}$. That is to say, the standard trapezoidal window function shown in the diagram of FIG. 8B is reshaped by extending the time segment providing the window-function value of 1 by a time period equivalent to the delay spread $\tau$. By extending the time segment $S_{23}$ in this way, the gradient of the straight line over the time segment $S_{24}$ becomes larger than the gradient of the straight line over the time segment $S_3$ of the standard trapezoidal window function shown in the diagram of FIG. 8B.

By reshaping the standard window function as described above, a time segment potentially causing an ISI can be excluded from the subject of the FFT process. In addition, much like the standard window function, the post-reshaping window function is also defined in that, if the time segment $S_{24}$ of the post-reshaping window function itself overlaps the time segment $S_{22}$ of the post-reshaping window function shifted by a time distance equivalent to the length Tu of the effective symbol in the time lapsing direction along the time axis as shown in a diagram of FIG. 16D, the sum of the values of the post-reshaping window function itself and the shifted post-reshaping window function at each point of time in the overlapping time segments $S_{22}$ and $S_{24}$ is equal to 1 over the overlapping time segments $S_{22}$ and $S_{24}$.

If the post-reshaping window function shown in a diagram of FIG. 15B is shifted by a distance corresponding to the length Tu of the effective symbol in the time lapsing direction along the time axis, the time segment $S_{22}$ of the shifted window function will overlap the time segment $S_{24}$ of the original window function itself and the sum of the values of the post-reshaping window function itself and the shifted post-reshaping window function in the overlapping time segments $S_{22}$ and $S_{24}$ is equal to 1 throughout the overlapping time segments $S_{22}$ and $S_{24}$.

The window-function utilization circuit 7-21 multiplies the post-reshaping window function shown in the diagram of FIG. 15B by the time-domain OFDM signal shown in the diagram of FIG. 15A as time-domain OFDM signal received from the orthogonal-demodulation circuit 5 in order to generate a post-multiplication time-domain OFDM signal which is also referred to as a weighted time-domain OFDM signal mentioned earlier.

Figure 16A:
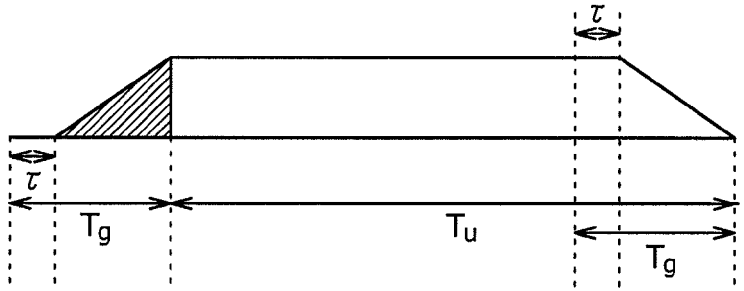
FIG. 16A is a diagram showing a post-multiplication time-domain OFDM signal generated by the window-function utilization circuit.

FIG. 16A is a diagram showing a post-multiplication time-domain OFDM signal generated by the window-function utilization circuit 7-21. The window-function utilization circuit 7-21 outputs the post-multiplication time-domain OFDM signal to the GI extraction circuit 7-22 and the GI-to-signal addition circuit 7-24.

Figure 16B:
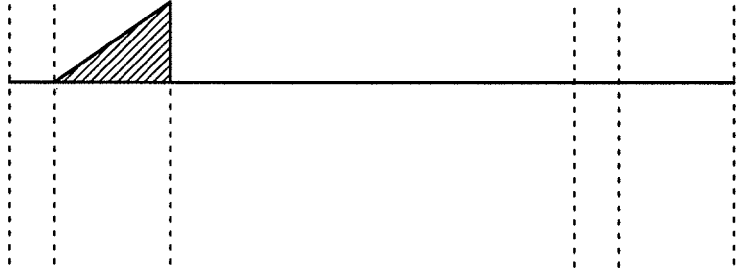
FIG. 16B is a diagram showing a GI extracted by a GI extraction circuit.
Figure 16C:
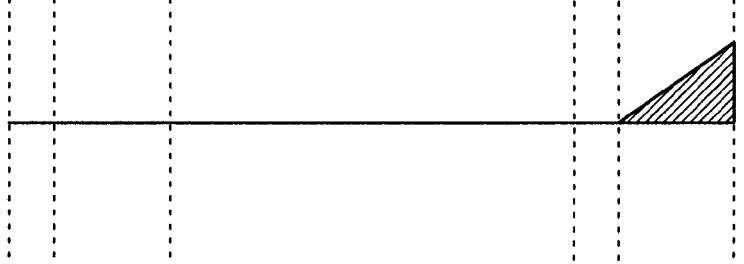
FIG. 16C is a diagram showing a GI delayed by a GI delaying circuit.
Figure 16D:
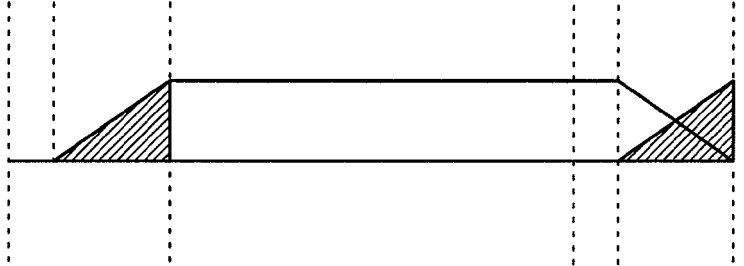
FIG. 16D is a diagram showing a time-domain OFDM signal output by a GI-to-signal addition circuit.
Figure 16E:
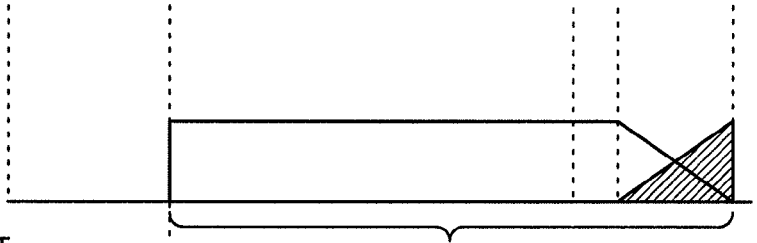
FIG. 16E is a diagram showing a time-domain OFDM signal output by an N-sample extraction circuit to an N-point FFT processing circuit employed in the FFT circuit shown in the block diagram of FIG. 14.

FIG. 16B is a diagram showing a GI extracted by the GI extraction circuit 7-22 from a post-multiplication time-domain OFDM signal supplied by the window-function utilization circuit 7-21 whereas FIG. 16C is a diagram showing a GI delayed by the GI delaying circuit 7-23. FIG. 16D is a diagram showing a time-domain OFDM signal output by the GI-to-signal addition circuit 7-24 whereas FIG. 16E is a diagram showing a time-domain OFDM signal output by the N-sample extraction circuit 7-25 to the N-point FFT processing circuit 7-26.

On the basis of an FFT window position specified by the window reproduction circuit 13, the GI extraction circuit 7-22 extracts a GI shown in the diagram of FIG. 16B from a time-domain OFDM signal shown in the diagram of FIG. 16A as a post-multiplication time-domain OFDM signal supplied by the window-function utilization circuit 7-21 and outputs the extracted GI to the GI delaying circuit 7-23.

The GI delaying circuit 7-23 delays a GI received from the GI extraction circuit 7-22 by an effective-symbol length Tu as shown in the diagram of FIG. 16C and outputs the delayed GI to the GI-to-signal addition circuit 7-24.

The GI-to-signal addition circuit 7-24 adds a GI shown in the diagram of FIG. 16C as a GI output by the GI delaying circuit 7-23 to the end portion of a time-domain OFDM signal shown in the diagram of FIG. 16A as a time-domain OFDM signal output by the window-function utilization circuit 7-21 to result in a time-domain OFDM signal shown in the diagram of FIG. 16D. The GI-to-signal addition circuit 7-24 then outputs the time-domain OFDM signal shown in the diagram of FIG. 16D to the N-sample extraction circuit 7-25.

The N-sample extraction circuit 7-25 extracts N samples located at positions following an FFF window position specified by the window reproduction circuit 13 from a time-domain OFDM signal shown in the diagram of FIG. 16D as a time-domain OFDM signal received from the GI-to-signal addition circuit 7-24 to result in a time-domain OFDM signal shown in the diagram of FIG. 16E as a time-domain OFDM signal representing the extracted N samples.

Subsequently, the N-sample extraction circuit 7-25 outputs a time-domain OFDM signal as the time-domain OFDM signal representing the extracted N samples to the N-point FFT processing circuit 7-26 which then carries out an FFT process on the N samples.

By reshaping a window function in accordance with a delay spread in order to generate a time-domain OFDM signal which serves as the subject of an FFT process and excludes a time segment potentially causing an ISI from the subject as described above, the occurrence of the ISI can be prevented even in a multipath environment. It is thus possible to provide the OFDM receiver with a characteristic of resistance against noises. In addition, this technique can be implemented with ease without increasing the number of FFT points.

Next, processing carried out by an OFDM receiver having the configuration described above is explained.

Figure 17:
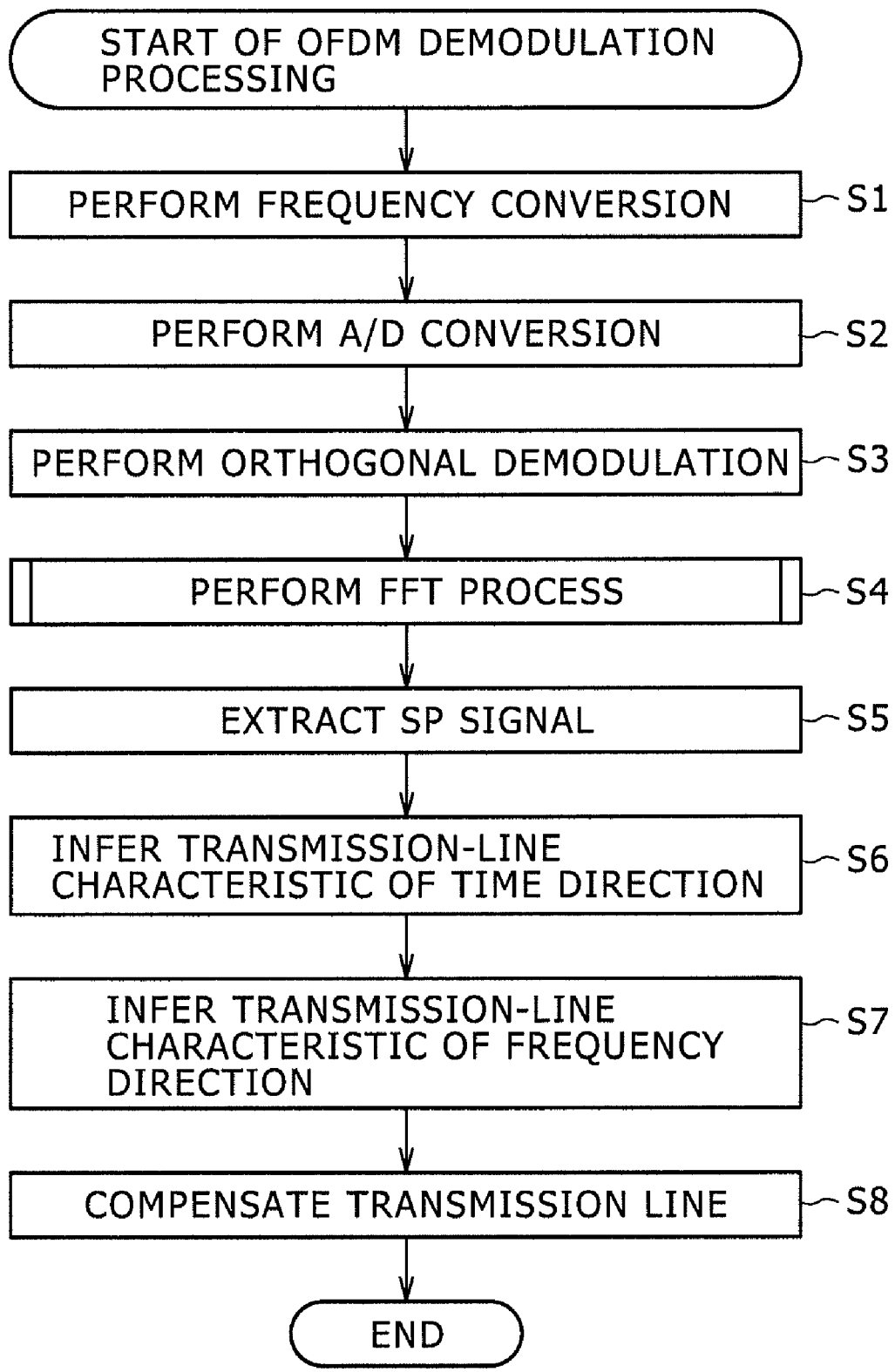
FIG. 17 shows a flowchart representing OFDM demodulation processing carried out by the OFDM receiver shown in the block diagram of FIG. 12.

First of all, an OFDM demodulation process carried out by the OFDM receiver is described by referring to a flowchart shown in FIG. 17.

The flowchart begins with a step $S_1$ at which the frequency conversion circuit 2 carries out a frequency conversion process of converting an RF signal received by the antenna 1 into an IF signal and outputs the IF signal obtained as a result of the frequency conversion process to the A/D conversion circuit 4.

Then, at the next step S2, the A/D conversion circuit 4 carries out an A/D conversion process of converting the analog IF signal received from the frequency conversion circuit 2 into a digital IF signal and outputs the digital IF signal obtained as a result of the A/D conversion process to the orthogonal-demodulation circuit 5.

Subsequently, at the next step S3, the orthogonal-demodulation circuit 5 carries out an orthogonal demodulation process in order to acquire a time-domain OFDM signal from the digital IF signal supplied by the A/D conversion circuit 4. The orthogonal-demodulation circuit 5 then outputs the time-domain OFDM signal obtained as a result of the orthogonal demodulation process to the carrier-frequency synchronization circuit 12, the FFT circuit 7 and the window reproduction circuit 13.

Then, at the next step S4, the FFT circuit 7 carries out an FFT process on the time-domain OFDM signal received from the orthogonal-demodulation circuit 5 in order to generate a frequency-domain OFDM signal and outputs the generated frequency-domain OFDM signal to the SP-signal extraction circuit 8 and the transmission-line compensation circuit 11. The processes carried out by the FFT circuit 7 will be described later in detail by referring to a flowchart shown in FIG. 18.

Subsequently, at the next step S5, the SP-signal extraction circuit 8 extracts an SP signal from the frequency-domain OFDM signal received from the FFT circuit 7 in order to infer a transmission-line characteristic prevailing at the position of an OFDM symbol associated with the SP signal as a transmission-line characteristic of a sub-carrier wave. The SP-signal extraction circuit 8 then outputs a signal representing the transmission-line characteristic of the sub-carrier wave to the time-direction transmission-line characteristic inference circuit 9.

Then, at the next step S6, the time-direction transmission-line characteristic inference circuit 9 infers transmission-line characteristics prevailing at positions of other OFDM symbols lined up in the time-axis direction in an area between the positions of specific OFDM symbols each associated with an SP signal as transmission-line characteristics of a sub-carrier wave on the basis of the transmission-line characteristics which have been inferred by the SP-signal extraction circuit 8 as the transmission-line characteristics which prevail at the positions of the specific OFDM symbols as the transmission-line characteristics of the sub-carrier wave. The time-direction transmission-line characteristic inference circuit 9 then outputs a signal representing transmission-line characteristics inferred by the time-direction transmission-line characteristic inference circuit 9 and the SP-signal extraction circuit 8 to the frequency-direction transmission-line characteristic inference circuit 10 and the delay-profile inference circuit 14.

Subsequently, at the next step S7, the frequency-direction transmission-line characteristic inference circuit 10 infers transmission-line characteristics prevailing at positions of OFDM symbols lined up in the frequency direction as transmission-line characteristics of sub-carrier waves on the basis of transmission-line characteristics output by the time-direction transmission-line characteristic inference circuit 9. As a result, the transmission-line characteristics prevailing at the positions of all OFDM symbols as transmission-line characteristics of sub-carrier waves are inferred. The frequency-direction transmission-line characteristic inference circuit 10 then outputs a signal representing all the inferred transmission-line characteristics to the transmission-line compensation circuit 11.

Then, at the next step S8, the transmission-line compensation circuit 11 removes distortion components, which are included in the frequency-domain OFDM signal received from the FFT circuit 7, by making use of transmission-line characteristics output by the frequency-direction transmission-line characteristic inference circuit 10. The transmission-line compensation circuit 11 then outputs a frequency-domain OFDM signal including no distortion components to circuits at a stage succeeding this OFDM receiver as an equalizer output signal, ending the processing represented by this flowchart.

Figure 18:
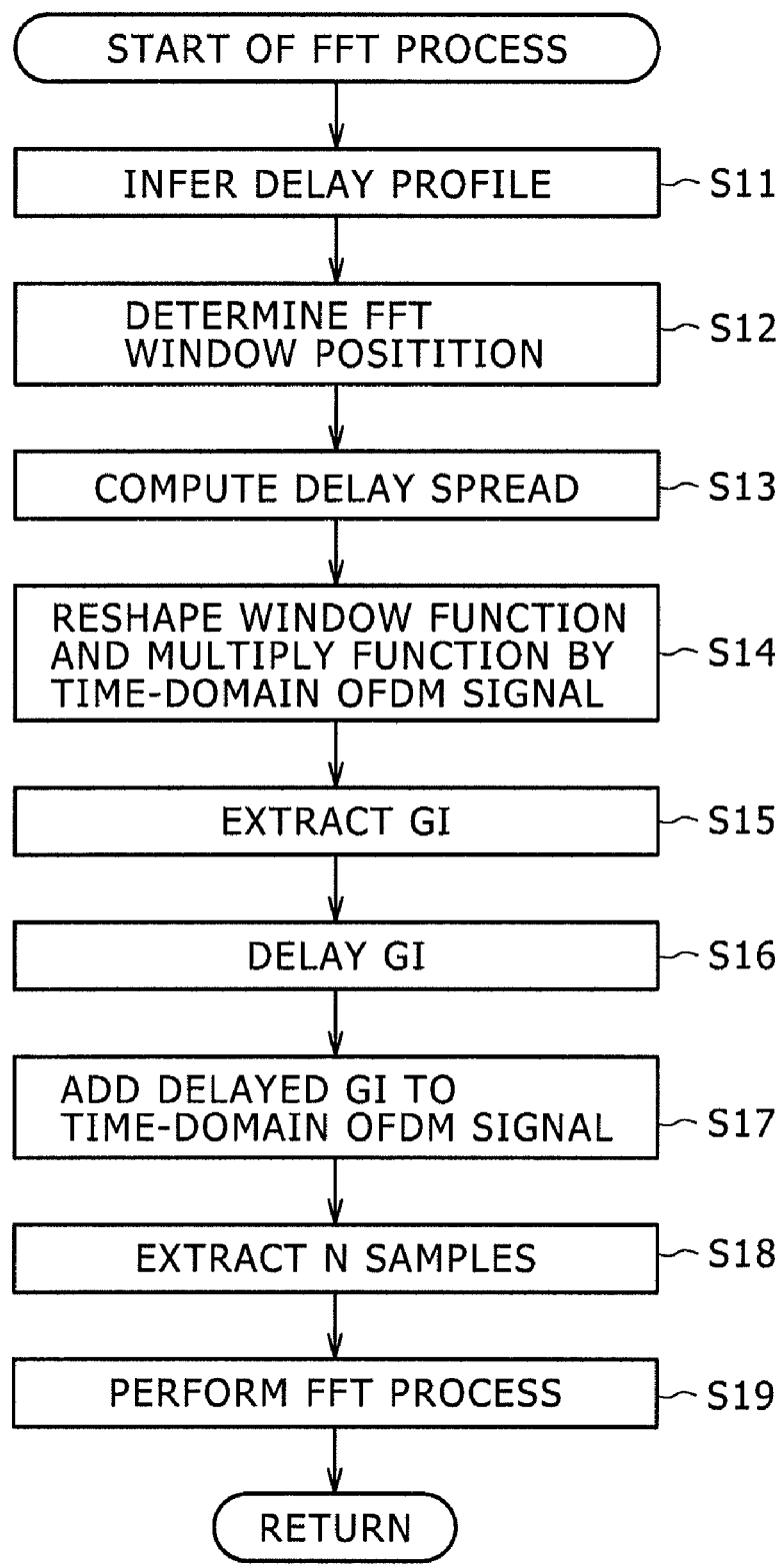
FIG. 18 shows a flowchart representing an FFT process carried out at a step S4 of the flowchart shown in FIG. 17.

Next, by referring to a flowchart shown in FIG. 18, the following description explains the processing carried out by the FFT circuit 7 at the step S4 of the flowchart shown in FIG. 17 and processes performed by circuits other than FFT circuit 7 as processes related to the processing.

The flowchart shown in FIG. 18 begins with a step S11 at which the delay-profile inference circuit 14 infers a delay profile of the transmission line and outputs a signal representing the inferred delay profile to the window reproduction circuit 13 and the delay-spread generation circuit 21.

Then, at the next step S12, the window reproduction circuit 13 determines an FFT window position and outputs a signal specifying the determined FFT window position to the FFT circuit 7.

Subsequently, at the next step S13, the delay-spread generation circuit 21 computes a delay spread and outputs a signal representing the computed delay spread to the FFT circuit 7.

Then, at the next step S14, the window-function utilization circuit 7-21 employed in the FFT circuit 7 forms a window function on the basis of an FFT window position specified by the window reproduction circuit 13 as well as a delay spread computed by the delay-spread generation circuit 21 and multiplies the window function by a time-domain OFDM signal received from the orthogonal-demodulation circuit 5 in order to generate a post-multiplication time-domain OFDM signal. The window-function utilization circuit 7-21 then outputs the post-multiplication time-domain OFDM signal to the GI extraction circuit 7-22 and the GI-to-signal addition circuit 7-24.

Subsequently, at the next step S15, the GI extraction circuit 7-22 extracts a GI from the time-domain OFDM signal received from the window-function utilization circuit 7-21 and outputs the extracted GI to the GI delaying circuit 7-23.

Then, at the next step S16, the GI delaying circuit 7-23 delays the GI received from the GI extraction circuit 7-22 by an effective-symbol length Tu and outputs the delayed GI to the GI-to-signal addition circuit 7-24.

Subsequently, at the next step S17, the GI-to-signal addition circuit 7-24 adds the GI received from the GI delaying circuit 7-23 to the end portion of the time-domain OFDM signal received from the window-function utilization circuit 7-21 to result in a time-domain OFDM signal including the added GI. The GI-to-signal addition circuit 7-24 then outputs the time-domain OFDM signal including the added GI to the N-sample extraction circuit 7-25.

Then, at the next step S18, the N-sample extraction circuit 7-25 extracts N samples located at positions following an FFT window position specified by the window reproduction circuit 13 from the time-domain OFDM signal received from the GI-to-signal addition circuit 7-24 to result in a time-domain OFDM signal representing the extracted N samples. The N-sample extraction circuit 7-25 then outputs the time-domain OFDM signal representing the extracted N samples to the N-point FFT processing circuit 7-26.

Subsequently, at the next step S19, the N-point FFT processing circuit 7-26 carries out an FFT process on the N samples in order to generate a frequency-domain OFDM signal. Then, the flow of the processing represented by the flowchart shown in FIG. 18 goes back to the step S4 of the flowchart shown in FIG. 17 in order to carry out the subsequent processes at the steps following the step S4.

The series of processes described previously can be carried out by hardware and/or execution of software. If the series of processes described above is carried out by execution of software, programs composing the software can be installed into a computer embedded in dedicated hardware, a general-purpose personal computer or the like from typically a network or a recording medium. In this case, the computer or the personal computer serves as the FFT circuit 7 described above. A general-purpose personal computer is a personal computer, which can be made capable of carrying out a variety of functions by installing a variety of programs into the personal computer. In the following description, the computer and the personal computer are referred to simply as the computer.

FIG. 19 is a block diagram showing a typical hardware configuration of the computer for executing programs of the software in order carry out the series of processes.

In the computer shown in the block diagram of FIG. 19, a CPU (Central Processing Unit) 51 carries out various kinds of processing by execution of programs stored in a ROM (Read Only Memory) 52 or programs loaded from a recording section 58 into a RAM (Random Access Memory) 53. The RAM 53 is also used for properly storing various kinds of information such as data desired in execution of the processing. The CPU 51, the ROM 52 and the RAM 53 are connected to each other by a bus 54.

The bus 54 is also connected to an input/output interface 55 which is connected to an input section 56, an output section 57, the recording section 58 cited above and a communication section 59. The input section 56 includes a keyboard, a mouse and/or a microphone whereas the output section 57 includes a display unit and/or a speaker. The recording section 58 includes a hard disk or a non-volatile memory. The communication interface 59 is typically a network interface. The input/output interface 55 is also connected to a drive 60 for driving a removable recording medium 61 such as an optical disk or a semiconductor memory.

In the computer with the configuration explained above, the CPU 51 carries out the series of processes by execution of a program loaded from the recording section 58 into the RAM 53 by way of the input/output interface 55 and the bus 54.

The programs loaded from the recording section 58 into the RAM 53 for execution by the CPU 51 are programs installed in advance in the recording section 58 from the removable recording medium 61. Instead of installing the programs from the removable recording medium 61 into the recording section 58, the programs can also be installed into the recording section 58 from a source through a wire or radio communication medium such as a local area network, the Internet of digital broadcasting.

It is worth noting that, in this specification, steps of the flowcharts described above can be carried out by the computer as a program not merely in a pre-prescribed order along the time axis, but also concurrently. In addition, each program can also be executed on an as-invoked basis or with a proper timing.

Possible embodiments of the present invention are by no means limited to the embodiment described above. That is to say, a variety of changes can be made to the embodiment as long as the changes are in a range not deviating from scope of the embodiments of the present invention. In addition, it should be understood by those skilled in the art that a variety of modifications, combinations, sub-combinations and alterations may occur, depending on design requirements and other factors as far as they are within the scope of the appended claims or the equivalents thereof.

What is claimed is:

1. A signal receiving apparatus comprising:
    profile inference means for inferring a delay profile from a frequency-domain Orthogonal Frequency Division Multiplexing signal;
    delay-spread computation means for computing a delay spread on the basis of a delay profile inferred by said profile inference means;
    position determination means for determining an Fast Fourier Transform window position by making use of a time-domain Orthogonal Frequency Division Multiplexing signal or a delay profile inferred by said profile inference means;
    signal-by-function multiplication means for multiplying a window function formed on the basis of a delay spread computed by said delay-spread computation means and a Fast Fourier Transform window position determined by said position determination means by a time-domain Orthogonal Frequency Division Multiplexing signal representing one Orthogonal Frequency Division Multiplexing symbol in order to generate a post-multiplication time-domain Orthogonal Frequency Division Multiplexing signal;
    interval extraction means for extracting a guide interval from a post-multiplication time-domain Orthogonal Frequency Division Multiplexing signal generated by said signal-by-function multiplication means;
    interval-to-signal addition means for adding a guide interval extracted by said interval extraction means to a portion included in a post-multiplication time-domain Orthogonal Frequency Division Multiplexing signal generated by said signal-by-function multiplication means as a portion starting from a position leading ahead of the end position of an Orthogonal Frequency Division Multiplexing symbol represented by said post-multiplication time-domain Orthogonal Frequency Division Multiplexing signal along a time axis by a time distance equal to a difference obtained as a result of subtracting a time segment corresponding to a delay spread computed by said delay-spread computation means from the time segment of said guide interval; and
    signal processing means for carrying out a Fast Fourier Transform process on a portion included in a post-multiplication time-domain Orthogonal Frequency Division Multiplexing signal generated by said signal-by-function multiplication means and provided with a guide interval added by said interval-to-signal addition means as a portion starting from a Fast Fourier Transform window position determined by said position determination means in order to transform said post-multiplication time-domain Orthogonal Frequency Division Multiplexing signal into said frequency-domain Orthogonal Frequency Division Multiplexing signal.

2. The signal receiving apparatus according to claim 1, wherein said signal-by-function multiplication means is capable of deriving a new window function, which has a value of 0 over a time segment starting from the start position of said new window function and having a length equal to said delay spread and has a value of 1 over an extension time segment also having a length equal to said delay spread, from an original window function given in advance as a standard window function having:
    a total length equal to the length of said one Orthogonal Frequency Division Multiplexing symbol;
    a value varying in a range between 0 and 1 in time segments included in said total length as a time segment corresponding to said guide interval and a time segment corresponding to a signal serving as a source from which said guide interval is copied; and
    a value of 1 in another time segment also included in said total length as a time segment to be extended by said extension time segment.

3. The signal receiving apparatus according to claim 1, wherein said delay-spread computation means computes a delay spread on the basis of a delay profile inferred by said profile inference section by finding a time distance between an earliest arriving wave and a latest arriving wave.

4. A signal receiving method comprising the steps of:
    inferring a delay profile from a frequency-domain Orthogonal Frequency Division Multiplexing signal;
    computing a delay spread on the basis of a delay profile inferred at said profile inference step;
    determining a Fast Fourier Transform window position by making use of a time-domain Orthogonal Frequency Division Multiplexing signal or a delay profile inferred at said profile inference step;
    multiplying a window function formed on the basis of a delay spread computed at said delay-spread computation step and a Fast Fourier Transform window position determined at said position determination step by a time-domain Orthogonal Frequency Division Multiplexing signal representing one Orthogonal Frequency Division Multiplexing symbol in order to generate a post-multiplication time-domain Orthogonal Frequency Division Multiplexing signal;
    extracting a guide interval from a post-multiplication time-domain Orthogonal Frequency Division Multiplexing signal generated at said multiplying step;
    adding a guide interval extracted at said interval extraction step to a portion included in a post-multiplication time-domain Orthogonal Frequency Division Multiplexing signal generated at said multiplying step as a portion starting from a position leading ahead of the end position of an Orthogonal Frequency Division Multiplexing symbol represented by said post-multiplication time-domain Orthogonal Frequency Division Multiplexing signal along a time axis by a time distance equal to a difference obtained as a result of subtracting a time segment corresponding to a delay spread computed at said delay-spread computation step from the time segment of said guide interval; and carrying out a Fast Fourier Transform process on a portion included in a post-multiplication time-domain Orthogonal Frequency Division Multiplexing signal generated at said multiplying step and provided with a guide interval added at said interval-to-signal addition step as a portion starting from a Fast Fourier Transform window position determined at said position determination step in order to transform said post-multiplication time-domain Orthogonal Frequency Division Multiplexing signal into said frequency-domain Orthogonal Frequency Division Multiplexing signal.

5. A non-transitory computer readable storage medium with an executable program stored thereon, wherein the program instructs a computer to perform the following steps of:

inferring a delay profile from a frequency-domain Orthogonal Frequency Division Multiplexing signal;

computing a delay spread on the basis of a delay profile inferred at said profile inference step;

determining a Fast Fourier Transform window position by making use of a time-domain Orthogonal Frequency Division Multiplexing signal or a delay profile inferred at said profile inference step;

multiplying a window function formed on the basis of a delay spread computed at said delay-spread computation step and a Fast Fourier Transform window position determined at said position determination step by a time-domain Orthogonal Frequency Division Multiplexing signal representing one Orthogonal Frequency Division Multiplexing symbol in order to generate a post-multiplication time-domain Orthogonal Frequency Division Multiplexing signal;

extracting a guide interval from a post-multiplication time-domain Orthogonal Frequency Division Multiplexing signal generated at said multiplying step;

adding a guide interval extracted at said interval extraction step to a portion included in a post-multiplication time-domain Orthogonal Frequency Division Multiplexing signal generated at said multiplying step as a portion starting from a position leading ahead of the end position of an Orthogonal Frequency Division Multiplexing symbol represented by said post-multiplication time-domain Orthogonal Frequency Division Multiplexing signal along a time axis by a time distance equal to a difference obtained as a result of subtracting a time segment corresponding to a delay spread computed at said delay-spread computation step from the time segment of said guide interval; and carrying out a Fast Fourier Transform process on a portion included in a post-multiplication time-domain Orthogonal Frequency Division Multiplexing signal generated at said multiplying step and provided with a guide interval added at said interval-to-signal addition step as a portion starting from a Fast Fourier Transform window position determined at said position determination step in order to transform said post-multiplication time-domain Orthogonal Frequency Division Multiplexing signal into said frequency-domain Orthogonal Frequency Division Multiplexing signal.

6. A signal receiving apparatus comprising:

a profile inference section configured to infer a delay profile from a frequency-domain Orthogonal Frequency Division Multiplexing signal;

a delay-spread computation section configured to compute a delay spread on the basis of a delay profile inferred by said profile inference section;

a position determination section configured to determine a Fast Fourier Transform window position by making use of a time-domain Orthogonal Frequency Division Multiplexing signal or a delay profile inferred by said profile inference section;

a signal-by-function multiplication section configured to multiply a window function formed on the basis of a delay spread computed by said delay-spread computation section and a Fast Fourier Transform window position determined by said position determination section by a time-domain Orthogonal Frequency Division Multiplexing signal representing one Orthogonal Frequency Division Multiplexing symbol in order to generate a post-multiplication time-domain Orthogonal Frequency Division Multiplexing signal;

an interval extraction section configured to extract a guide interval from a post-multiplication time-domain Orthogonal Frequency Division Multiplexing signal generated by said signal-by-function multiplication section;

an interval-to-signal addition section configured to add a guide interval extracted by said interval extraction section to a portion included in a post-multiplication time-domain Orthogonal Frequency Division Multiplexing signal generated by said signal-by-function multiplication section as a portion starting from a position leading ahead of the end position of an Orthogonal Frequency Division Multiplexing symbol represented by said post-multiplication time-domain Orthogonal Frequency Division Multiplexing signal along a time axis by a time distance equal to a difference obtained as a result of subtracting a time segment corresponding to a delay spread computed by said delay-spread computation section from the time segment of said guide interval; and a signal processing section configured to carry out a Fast Fourier Transform process on a portion included in a post-multiplication time-domain Orthogonal Frequency Division Multiplexing signal generated by said signal-by-function multiplication section and provided with a guide interval added by said interval-to-signal addition section as a portion starting from an Fast Fourier Transform window position determined by said position determination section in order to transform said post-multiplication time-domain Orthogonal Frequency Division Multiplexing signal into said frequency-domain Orthogonal Frequency Division Multiplexing signal.

* * * * *